United States Patent
Lee et al.

(10) Patent No.: US 12,373,732 B2
(45) Date of Patent: Jul. 29, 2025

(54) MANAGEMENT METHOD OF MACHINE LEARNING MODEL FOR NETWORK DATA ANALYTICS FUNCTION DEVICE

(71) Applicant: ELECTRONICS AND TELECOMMUNICATIONS RESEARCH INSTITUTE, Daejeon (KR)

(72) Inventors: Soohwan Lee, Daejeon (KR); Myung Ki Shin, Daejeon (KR); Seung-Ik Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 991 days.

(21) Appl. No.: 17/402,151

(22) Filed: Aug. 13, 2021

(65) Prior Publication Data
US 2022/0108214 A1    Apr. 7, 2022

(30) Foreign Application Priority Data

| Aug. 13, 2020 | (KR) | 10-2020-0101945 |
| Aug. 27, 2020 | (KR) | 10-2020-0108740 |
| Feb. 18, 2021 | (KR) | 10-2021-0022055 |
| Feb. 24, 2021 | (KR) | 10-2021-0024702 |
| Mar. 26, 2021 | (KR) | 10-2021-0039682 |
| Apr. 1, 2021  | (KR) | 10-2021-0042573 |
| Apr. 16, 2021 | (KR) | 10-2021-0050036 |
| May 7, 2021   | (KR) | 10-2021-0059184 |

(Continued)

(51) Int. Cl.
*G06N 20/00* (2019.01)
*H04W 48/16* (2009.01)
*H04W 48/18* (2009.01)
*H04W 60/04* (2009.01)

(52) U.S. Cl.
CPC ............ *G06N 20/00* (2019.01); *H04W 48/16* (2013.01); *H04W 48/18* (2013.01); *H04W 60/04* (2013.01)

(58) Field of Classification Search
CPC ....... G06N 20/00; G06N 20/20; H04W 48/16; H04W 48/18; H04W 60/04; H04W 24/02; H04W 8/00; H04W 4/60; H04W 8/18; H04W 72/12; H04L 41/16; H04L 41/40;
(Continued)

(56) References Cited

U.S. PATENT DOCUMENTS

| 8,181,195 B2    | 5/2012 | Sardera |
| 2019/0050578 A1 | 2/2019 | Choi |
| 2019/0155922 A1 | 5/2019 | Kim et al. |

(Continued)

FOREIGN PATENT DOCUMENTS

WO    WO-2021136601 A1 *   7/2021   ............. H04L 41/12

OTHER PUBLICATIONS

"KI #19, New Sol, Trained Data Model Sharing between NWDAF instances," 3GPP TSG-WG SA2 Meeting #139E, Jun. 1-12, 2020.
(Continued)

*Primary Examiner* — Daniel T Pellett

(57) ABSTRACT

A machine learning (ML) model management method for a network data analytics function (NWDAF) device is disclosed. The NWDAF device performs at least one of an analytics logical function (AnLF) for network data and an ML model training logical function (MTLF).

17 Claims, 18 Drawing Sheets

(30) Foreign Application Priority Data

May 27, 2021 (KR) .......................... 10-2021-0068523
Aug. 13, 2021 (KR) .......................... 10-2021-0107543

(58) Field of Classification Search
CPC ............... H04L 41/5058; H04L 41/042; H04L 41/0876; H04L 41/145; H04L 67/51
See application file for complete search history.

(56) References Cited

U.S. PATENT DOCUMENTS

| | | |
|---|---|---|
| 2020/0112921 A1 | 4/2020 | Han et al. |
| 2020/0196155 A1* | 6/2020 | Bogineni ............ H04L 41/5025 |
| 2020/0244557 A1 | 7/2020 | Nie et al. |
| 2022/0321423 A1* | 10/2022 | Norrman ............. H04L 41/0853 |
| 2023/0146099 A1* | 5/2023 | Ouyang ............. H04L 41/0806 709/223 |
| 2023/0153685 A1* | 5/2023 | Puente Pestaña ...... G06N 20/00 706/12 |

OTHER PUBLICATIONS

"KI #2, New Sol, Federated Learning among Multiple NWDAF Instances," 3GPP TSG-WG SA2 Meeting #139E e-meeting, Jun. 1-12, 2020.

\* cited by examiner

MANAGEMENT METHOD OF MACHINE LEARNING MODEL FOR NETWORK DATA ANALYTICS FUNCTION DEVICE

CROSS-REFERENCE TO RELATED APPLICATIONS

This application claims the benefit of Korean Patent Application No. 10-2020-0101945 filed on Aug. 13, 2020, Korean Patent Application No. 10-2020-0108740 filed on Aug. 27, 2020, Korean Patent Application No. 10-2021-0022055 filed on Feb. 18, 2021, Korean Patent Application No. 10-2021-0024702 filed on Feb. 24, 2021, Korean Patent Application No. 10-2021-0039682 filed on Mar. 26, 2021, Korean Patent Application No. 10-2021-0042573 filed on Apr. 1, 2021, Korean Patent Application No. 10-2021-0050036 filed on Apr. 16, 2021, Korean Patent Application No. 10-2021-0059184 filed on May 7, 2021, Korean Patent Application No. 10-2021-0068523 filed on May 27, 2021, and Korean Patent Application No. 10-2021-0107543 filed on Aug. 13, 2021, in the Korean Intellectual Property Office, the entire disclosure of which is incorporated herein by reference for all purposes.

BACKGROUND

1. Field of the Invention

One or more example embodiments relate to a method for managing a machine learning (ML) model for a network data analytics function (NWDAF) device, and more particularly, proposes a process of learning, provisioning, and updating an ML model.

2. Description of the Related Art

In a 5G mobile communication system, for automation and optimization of the system, a network data analytics function (NWDAF) collects raw data with each network function and application function, converts the raw data into big data, and processes the big data to provide network analytics information.

To this end, the NWDAF may consider a machine learning (ML) model to derive the network analytics information. However, there is no specific plan on how to use the ML model under various conditions.

SUMMARY

Example embodiments provide a method for provisioning a machine learning (ML) model a network data analytics function (NWDAF) device.

Example embodiments provide a method for updating an ML model for an NWDAF device.

Example embodiments provide a method for sharing an ML model for an NWDAF device.

According to an aspect, there is provided a method for discovering an ML model, the method performed by a first NWDAF device including invoking, from an NRF device, an ML model discovery request service operation, invoking, from the NRF device, a discovery response service operation with respect to the ML model discovery request service operation, and selecting an NWDAF instance included in the discovery response service operation. The discovery request service operation may include ML model-related information provided by a second NWDAF device that performs a model training logical function (MTLF).

The NRF device may be configured to store an network function (NF) profile for the MTLF by invoking, from the second NWDAF device, a registration request service operation with an NF, and the registration request service operation may include at least one of (i) a list of Analytic IDs, (ii) a supported service, (iii) a serving area, and (iv) subscribed network slice selection assistance information (S-NSSAI).

The NRF device may be configured to store an NF profile for the MTLF by invoking, from the second NWDAF device, a registration request service operation with an NF, and the registration request service operation may include at least one of (i) a list of Analytic IDs, (ii) a supported service, (iii) a serving area, (iv) S-NSSAI, and (v) ML model information including at least one of an ML model file address, an ML model file, a model ID, and a model version.

The selecting of the NWDAF instance may include selecting an NWDAF instance based on at least one of (i) S-NSSAI, (ii) an Analytic ID, (iii) a supported service, (iv) NWDAF serving area information, (v) NWDAF location information, (vi) an NF type of a data source, (vii) an NF Set ID of the data source, (viii) a supported analytics delay, and (ix) an NWDAF capability.

The first NWDAF device may be configured to perform local training of federation learning, and support the MTLF, and the second NWDAF device may be configured to perform global training of federation learning, and support the MTLF.

The registration request service operation may include at least one of a list of Analytic IDs, a supported service, a serving area, S-NSSAI, ML model information including at least one of an ML model file address, an ML model file, a model ID, and a model version, and an ML model training capability or an ML model update capability.

According to another aspect, there is provided a method for provisioning an ML model, the method performed by a first NWDAF device including invoking, from a second NWDAF device that performs an MTLF, a subscription service operation for provisioning of the ML model; and invoking, from the second NWDAF device, a notification service operation for the subscription service.

The subscription service operation may include at least one of (i) an Analytic ID, (ii) S-NSSAI, (iii) a target area of interest, (iv) an application ID, (v) a target user equipment (UE), (v) an ML model target period, and (vi) an expiry time.

The subscription service operation may include at least one of (i) an Analytic ID, (ii) S-NSSAI, (iii) a target area of interest, (iv) an application ID, (v) a target UE, (v) an ML model target period, (vi) an expiry time, and (vii) ML model information including at least one of an ML model file address, an ML model file, a model ID, and a model version.

The notification service operation may include at least one of (i) ML model information including an ML model file or an ML model file address, (ii) a validity period, and (iii) a spatial validity.

The notification service operation may include at least one of (i) ML model information including at least one of an ML model file address, an ML model file, a model ID, and a model version, (ii) a validity period, and (iii) a spatial validity.

The invoking of the subscription service operation for provisioning of the ML model may include invoking a subscription service operation for provisioning of a second ML model after a subscription for provisioning of a first ML model is completed, and the subscription service operation may include a subscription ID same as a subscription ID for the first ML model.

The subscription service operation may include at least one of (i) an Analytic ID, (ii) S-NSSAI, (iii) a target area of interest, (iv) an application ID, (v) a target UE, (v) an ML model target period, (vi) an expiry time, (vii) ML model information including at least one of an ML model file address, an ML model file, a model ID, and a model version, and (viii) an alternative ML model flag.

The first NWDAF device may be configured to perform local training of federation learning, and support the MTLF, and the second NWDAF device may be configured to perform global training of federation learning, and support the MTLF.

The notification service operation may include at least one of (i) ML model information including at least one of an ML model file address, an ML model file, a model ID, and a model version, (ii) a validity period, and (iii) a spatial validity.

The method may further include locally training the ML model, invoking, from the second NWDAF device, an ML model update notification service operation, and invoking, from the second NWDAF device that globally updates the ML model, a notification service operation for provisioning of the ML model. The first NWDAF device may be configured to perform local training of federation learning on the ML model, and the second NWDAF device may be configured to perform global training of federation learning on the ML model.

The method may further include locally training the ML model, and invoking, from the second NWDAF device that globally updates the ML model, an ML model update notification service operation. The first NWDAF device may be configured to perform local training of federation learning on the ML model, and the second NWDAF device may be configured to perform global training of federation learning on the ML model.

According to still another aspect, there is provided a method for requesting information of an ML model, the method performed by a first NWDAF device including invoking, by the first NWDAF device, a request service operation for model information of the ML model from a second NWDAF device that performs an MTLF, and invoking, from the second NWDAF device, a response service operation for the request service operation.

The request service operation may include at least one of (i) an Analytic ID, (ii) S-NSSAI, (iii) a target area of interest, (iv) an application ID, (v) a target UE, (v) an ML model target period, and (vi) an expiry time.

The request service operation may include at least one of (i) an Analytic ID, (ii) S-NSSAI, (iii) a target area of interest, (iv) an application ID, (v) a target UE, (v) an ML model target period, (vi) an expiry time, and (vii) ML model information including at least one of an ML model file address, an ML model file, a model ID, and a model version.

The response service operation may include at least one of (i) ML model information including an ML model file or an ML model file address, (ii) a validity period, and (iii) a spatial validity.

The response service operation may include at least one of (i) ML model information including at least one of an ML model file address, an ML model file, a model ID, and a model version, (ii) a validity period, and (iii) a spatial validity.

The first NWDAF device may be configured to perform local training of federation learning, and support the MTLF, and the second NWDAF device may be configured to perform global training of federation learning, and support the MTLF.

The response service operation may include at least one of (i) ML model information including at least one of an ML model file address, an ML model file, a model ID, and a model version, (ii) a validity period, and (iii) a spatial validity.

According to still another aspect, there is provided a method for updating an ML model, the method including receiving, from a second NWDAF device that selects a first NWDAF device, an invocation for an ML model training subscription service operation, locally training the ML model, and invoking, from the second NWDAF device that globally updates the ML model, an ML model training notification service operation.

The first NWDAF device may be configured to perform local training of federation learning on the ML model, and the second NWDAF device may be configured to perform global training of federation learning on the ML model.

According to still another aspect, there is provided a method for updating an ML model, the method including receiving, from a second NWDAF device that selects a first NWDAF device, an invocation for an ML model training request service operation, locally training the ML model, and invoking, from the second NWDAF device that globally updates the ML model, an ML model training response service operation.

The first NWDAF device may be configured to perform local training of federation learning on the ML model, and the second NWDAF device may be configured to perform global training of federation learning on the ML model.

Additional aspects of example embodiments will be set forth in part in the description which follows and, in part, will be apparent from the description, or may be learned by practice of the disclosure.

According to example embodiments, a method for provisioning an ML model for an NWDAF device may allow the ML model to be efficiently used.

According to example embodiments, a method for updating an ML model for an NWDAF device may improve accuracy of a network data analytics result provided by the ML model.

According to example embodiments, a method for sharing an ML model for an NWDAF device may allow various versions of ML models to be efficiently used.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
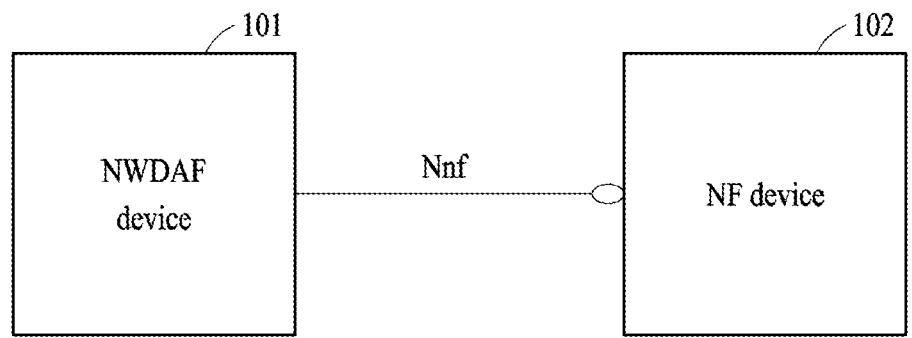
FIG. 1 is a diagram illustrating a network data analytics process according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms.

Various modifications may be made to the example embodiments. Here, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a diagram illustrating a network data analytics process according to an example embodiment.

<Reference Architecture for Data Analytics>

A network data analytics function (NWDAF) device 101 may use a mechanism and interface specified with respect to a 5G core (5GC) network.

The NWDAF device 101 may interact with different entities for different purposes.

- Data collection based on event subscriptions provided by an access and mobility management function (AMF), a session management function (SMF), a policy control function (PCF), unified data management (UDM), AF (directly or through NEF) and OAM (Operations, administration and management)
- Analytics and data collection using a data collection coordination function (DCCF)
- Information search from a datastore (for example, UDR through UDM for subscription interest-related information)
- Information storage and search using an analytics data repository function (ADRF)
- Analytics and data collection using a messaging framework adapter function (MFAF)
- Search of information on a network function (NF) (for example, using a network repository function (NRF) for NF-related information)
- On-demand provision of analytics for a consumer
- Mass data provision to a consumer A single instance or multiple instances of the NWDAF device 101 may be deployed in a PLMN (Public Land Mobile Network). When multiple NWDAF instances are deployed, an architecture may support deploying the NWDAF device 101 as a central NF device 102, a distributed NF collection, or a combination of the two. When the multiple NWDAF instances are deployed, the NWDAF device 101 may serve as an aggregation point (that is, an NWDAF device that performs aggregation of analytics, aggregation of a machine learning (ML) model of an untrained initial model or aggregation of a trained model). In addition, the NWDAF device 101 may generate aggregate analytics (per Analytic ID) by collecting analytics information from another NWDAF device capable of having another service area, or may perform federation learning or aggregation training (per Analytic ID) by training an ML model on each of the NWDAF devices.

When there are multiple NWDAF devices 101, the NWDAF devices 101 may not need to provide the same type of analytics result. That is, some NWDAF devices 101 may specialize in providing a specific type of analytics. The Analytic ID may be used to identify a supported analytics type that may be generated by the NWDAF device 101.

An instance of the NWDAF device 101 may be deployed with a 5GC NF.

The NWDAF device 101 may provide analytics for the 5GC NF and the OAM. The NWDAF device 101 may be disassembled as follows.

(i) Analytics Logical Function (AnLF):

The NWDAF device 101 that performs an AnLF may perform inference and derive analytics information (that is, derive a statistic and/or prediction in response to an analytics consumer request). In addition, the NWDAF device 101 that performs the AnLF may expose an analytics service for network data (for example, Nnwdaf_AnalyticsSubscription or Nnwdaf_AnalyticsInfo).

(ii) Model Training Logical Function (MTLF)

The NWDAF device 101 that performs an MTLF may train an ML model and expose a new training service (for example, provision of an untrained initial version of model or a trained model).

The NWDAF device 101 may include each of the MTLF and the AnLF, or may support both functions. In the example embodiments, the NWDAF device 101 not marked as the MTLF or the AnLF may perform both the MTLF and the AnLF.

The NWDAF device 101 that performs the AnLF may set an ID and an Analytic ID of an NWDAF device that performs the MTLF so as to search for a trained ML model. The NWDAF device 101 that performs the AnLF may search for the NWDAF device that performs the MTLF using an MTLF ID.

In addition, the NWDAF device 101 that performs the MTLF may discover and select an NWDAF device that supports the MTLF for federation learning. In this case, the NWDAF device 101 may perform local training and global training in federation learning.

Analytics information on network data may be statistical information or prediction information on a past event. Instances of various NWDAF devices may be present in the 5GC, and may be specialized for each type of analytics. An instance of an NWDAF device is described in a profile of an NWDAF device stored in an NRF device.

In order to ensure accuracy of analytics output, the NWDAF device 101 may detect and delete, based on abnormal behavior analytics of a user equipment (UE) including an abnormal UE list and an observed time window, input data from abnormal UE(s). In addition, the NWDAF device 101 may generate a new model without input data related to the abnormal UE list during the observed time window and/or generate an analytics result for network data, and then may transmit the new model or the network data to the subscribed NWDAF device 101 or update the new model or the network data.

The NWDAF device 101 may notify the NF device 102, which is a consumer, of a decrease in accuracy of previous analytics, due to noise data.

The NF device 102 may include any one of the MTLF and the AnLF capable of providing a service operation (for example, an analytic exposure operation, an ML model provisioning operation, or an ML model training operation) required for a type of analytics required, or an instance of each NWDAF device 101 may provide the following information so as to assist in searching for and selecting an instance of the NWDAF device 101 including both the MTLF and the AnLF.

List of Analytic IDs Supported when Registering with an NRF Along with Another NRF Registration Element in an NF Profile (Available for Each Supported Service)

The NF device 102 that needs to search for an NWDAF instance that provides support for some specific service operations for a specific type of analytics may query the NRF with respect to the NWDAF device 101 that supports a required service operation and a required Analytic ID.

The NWDAF device 101 that performs the MTLF may register an ML model provisioning service and a training service (that is, Nnwdaf_MLModelProvision, Nnwdaf_MLModelInfo, Nnwdaf_MLModelUpdate, Nnwdaf_MLModelTraining, and Nnwdaf_MLModelTrainingInfo) when an ML model is providable and trainable with respect to the Analytic ID.

The 5GC NF and the OAM, which are consumers, may determine how to use data analytics provided by the NWDAF device 101.

Interaction between the 5GC NF(s) and the NWDAF device 101 may occur within the PLMN.

The NWDAF device 101 may have no knowledge of an NF application logic. An NWDAF may use subscription data, but may use the subscription data only for statistical purposes. An NWDAF architecture may allow multiple NWDAF instances to be arranged in a hierarchy/tree using the flexible number of layers/branches. The number and configuration of hierarchies in a hierarchical structure as well as a function of each NWDAF instance may be changed.

In a hierarchical arrangement, the NWDAF device 101 may provide a data collection exposure function for generating analytics based on data collected by another NWDAF when a DCCF and an MFAF are not present in a network.

In some network deployments, in order to make it searchable (for example, for UE mobility analytics), the NWDAF device 101 may be configured to register with UDM (Nudm_UECM_Registration service operation) with respect to a UE in service operation and a related Analytic ID.

When providing a service to the UE or starts collecting data on the UE, the NWDAF device 101 may register with the UDM. Deregistration of the UDM may occur when the NWDAF device 101 deletes analytics context information on the UE for the related Analytic ID.

A data collection procedure for analytics of the UE may require user consent.

Figure 2:
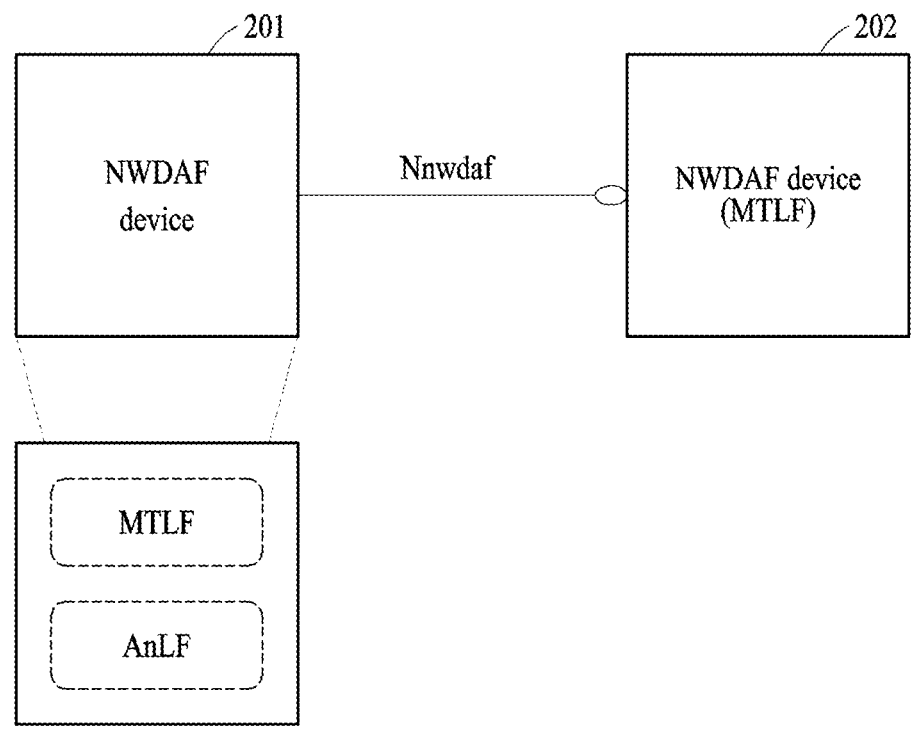
FIG. 2 is a diagram illustrating an operation of a network data analytics function (NWDAF) device according to an example embodiment.

FIG. 2 is a diagram illustrating an operation of an NWDAF device according to an example embodiment.

A 5G system architecture may allow an NWDAF device 201 including an AnLF to use a provisioning service operation and a training service operation with respect to an ML model of an untrained initial model or a trained ML model in another NWDAF device 202 that supports an MTLF.

The AnLF and the MTLF may be defined as follows.

(i) AnLF: The NWDAF device 101 including the AnLF may perform inference, derive analytics information (that is, derive a statistic and/or prediction in response to an analytics consumer request), and expose an analytics service (for example, Nnwdaf_AnalyticsSubscription or Nnwdaf_AnalyticsInfo).

(ii) MTLF: The NWDAF device 101 including the MTLF may train an ML model and expose a new training service (for example, trained model provision and model training).

In the example embodiments, the AnLF may support Nnwdaf_AnalyticsInfo (data analytics information) or Nnwdaf_AnalyticsSubscription (analytics subscription) service. In addition, the MTLF may support services such as Nnwdaf_MLModelProvision (ML model provisioning), Nnwdaf_MLModelInfo (ML model information request), Nnwdaf_MLModelUpdate (ML model update), Nnwdaf_MLModelTraining (ML model training), and Nnwdaf_MLModelTrainingInfo (ML model training information).

An Nnwdaf interface may be used to request and subscribe to a provisioning service for an untrained initial version of ML model or a trained ML model in an NWDAF. The ML model provisioning service of the NWDAF may be described with reference to FIG. 5. In addition, the Nnwdaf interface may be used by the NWDAF device 101 that supports the MTLF to request and subscribe to an ML model training service for model learning and cooperative learning. The ML model training service of the NWDAF may be described by the operations illustrated in FIGS. 11 to 15.

Figure 3:
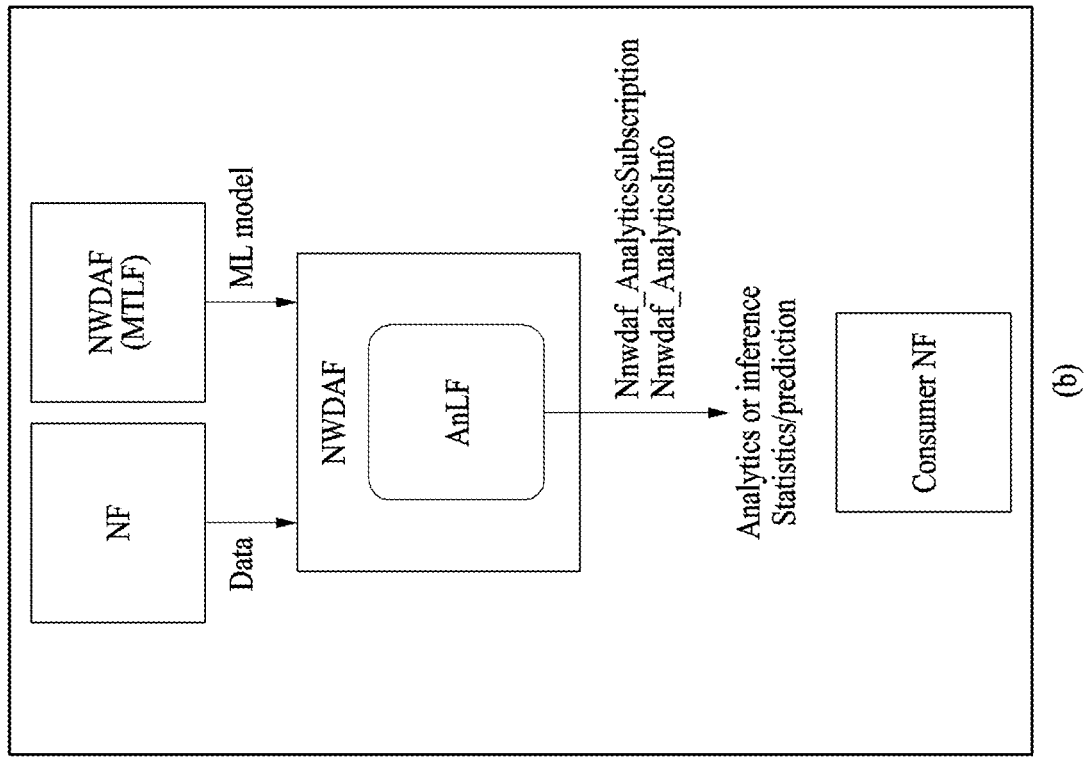
FIG. 3 is a diagram illustrating an structure of an NWDAF device according to an example embodiment.
Figure 3:
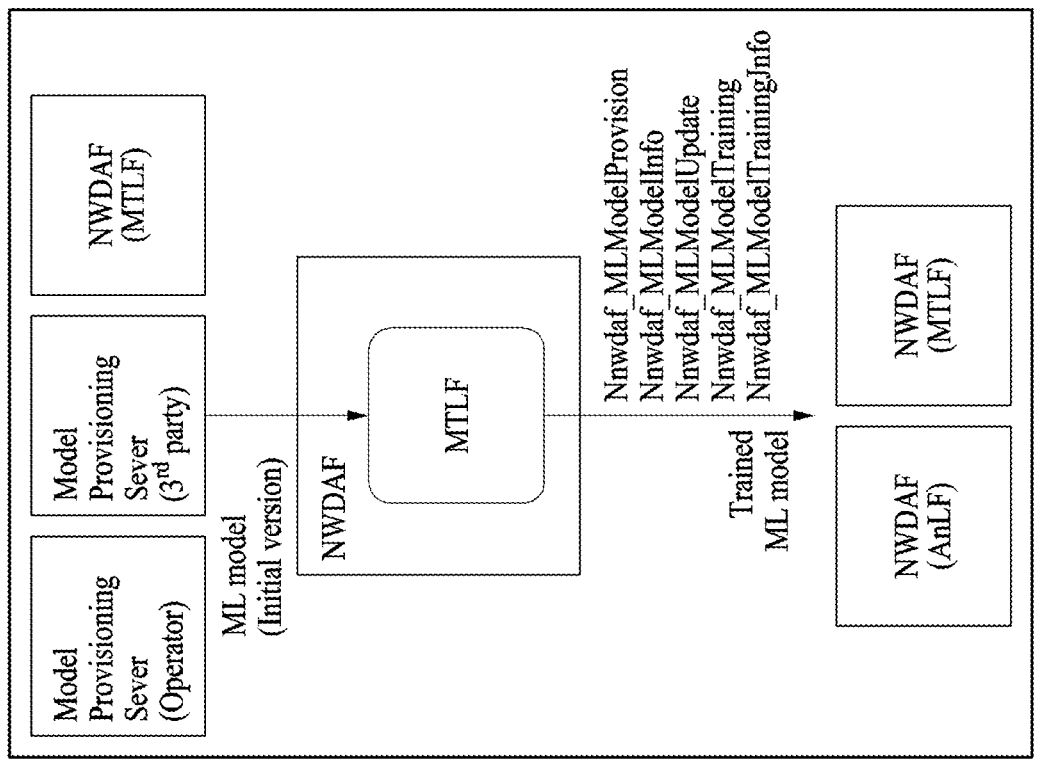

FIG. 3 is a diagram illustrating an structure of an NWDAF device according to an example embodiment.

Referring to FIG. 3(a), an operation of an NWDAF device that performs an MTLF is described. The NWDAF device may receive an initial version of ML model from a model provisioning server (operator), a model provisioning server ($3^{rd}$ party), or another NWDAF device that performs the MTLF. Then, after training the initial version of ML model, the NWDAF device may provide the trained ML model to an NWDAF device that performs an AnLF or MTLF through an Nnwdaf_MLModelProvision service (model provisioning service) or Nnwdaf_MLModelInfo service (model information service). In addition, for update of the ML model, the NWDAF device may use an Nnwdaf_MLModelUpdate, Nnwdaf_MLModelTraining, or Nnwdaf_MLModelTrainingInfo service.

Referring to FIG. 3(b), an operation of an NWDAF device that performs an AnLF is performed. The NWDAF device illustrated in FIG. 3(b) may collect data from a DCCF device and a data source (NF device or ADRF device), and receive an ML model from an NWDAF device that performs an MTLF.

Then, the NWDAF device that performs the AnLF may analyze the collected data using the ML model. A data analytics result may be provided to a consumer NF device in a statistical or predictive manner.

Figure 4:
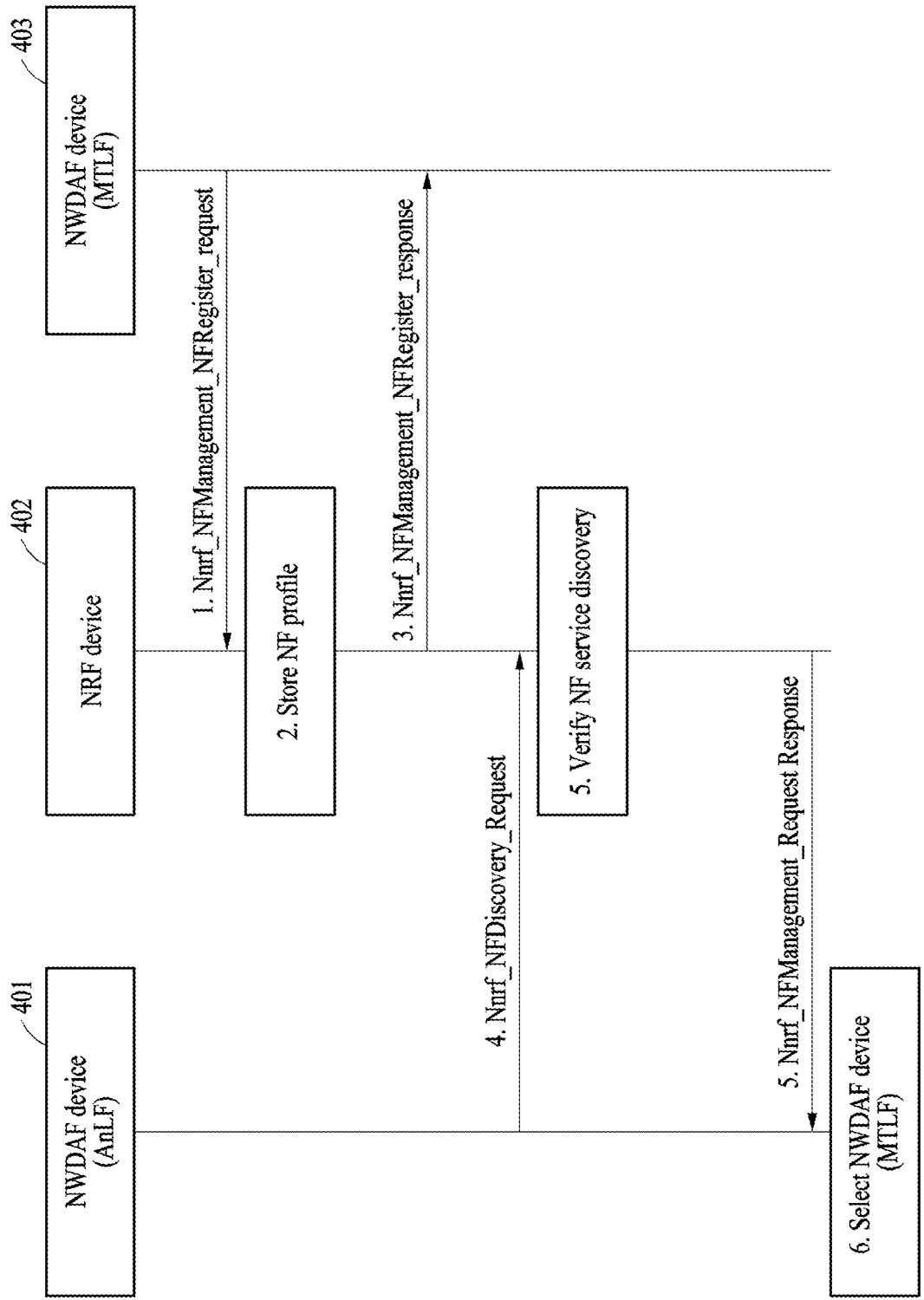
FIG. 4 is a flowchart illustrating an ML model discovery process according to an example embodiment.

FIG. 4 is a flowchart illustrating an ML model discovery process according to an example embodiment.

<Discovery and Selection of NWDAF>

An NWDAF device 401 (service consumer) may use an NWDAF search principle to select an NWDAF device that supports requested analytics information, required analytics function, and/or requested ML model information.

The NWDAF device 401 may require other search and selection parameters. Various methods of performing a search and selection mechanism may vary depending on various types of analytics/data (NF-related analytics/data and UE-related analytics/data). The NF-related analytics/data may indicate analytics/data that does not require an SUPI or SUPI group (for example, NF load analytics). The UE-related analytics/data may indicate analytics/data that requires an SUPI or SUPI group (for example, UE mobility analytics).

In order to search for an NWDAF device that supports an AnLF or an NWDAF device that supports an MTLF using an NRF, the following conditions may need to be satisfied.

When (i) an ML model to be provided/trained is related to NF(s) and (ii) an NWDAF service consumer (other than an NWDAF) is not capable of providing an area of interest for requested data analytics, the NWDAF device 401 may select an NWDAF having a large service area from candidate NWDAFs. In response to discovery, alternatively, when the NWDAF device 401 receives NWDAF(s) having an aggregation capability (for example, an ML model aggregation capability) or an ML update capability, the NWDAF device 401 may preferably select an NWDAF device having a large serving area and an aggregation capability (for example, an ML model aggregation capability or ML model update capability) or an ML model update capability.

When the NWDAF device 401 is not capable of providing the requested data analytics (for example, when a selected NWDAF device rejects an analytics request/subscription because an NF device is out of a service area of the NWDAF device), the NWDAF device 401 may query an NRF device 402 with a service area of the NF device to determine another target NWDAF device.

(ii) When an ML model to be provided/trained is related to UE(s) and an NWDAF service consumer (other than an NWDAF) is not capable of providing an area of interest for the requested ML model to be provided/trained, the NWDAF device 401 may select an NWDAF device 403 having a large service area from candidate NWDAF devices 403. In response to discovery, alternatively, when the NWDAF device 401 receives NWDAF device(s) 403 having an aggregation capability (for example, an ML model aggregation capability and an ML model update capability), the NWDAF device 401 may preferably select the NWDAF device 403 having an aggregation capability (for example, an ML model aggregation capability and an ML model update capability) with a large serving area.

When the NWDAF device 401 is not capable of providing an ML model to be provided/trained for requested UE(s) (for example, an NWDAF providing another service area), the NWDAF device 401 may reject a subscription or request for provision of the ML model to be provided/trained, or determine an AMF that serves an UE as specified. In order to request UE location information from the AMF and discover another target NWDAF that serves a region where the UE(s) is located, the NWDAF device 401 may query the NRF device 402 with a tracking area where the UE is located.

When the NWDAF device 401 needs to search for the NWDAF device 403 capable of collecting data from a specific data source identified as an NF set ID or NF type, the NWDAF device 401 may query the NRF device 402 that provides the NF set ID or NF type in a search request.

An NF set ID or NF type of a data source that serves a specific UE may be determined.

In order to search for an NWDAF registered in a UDM with respect to a given UE, the NWDAF device 401 or other NWDAFs interested in UE-related data or analytics may make a query to a UDM device to search for an instance of the NWDAF device 403 that is already providing a service to the UE.

A PCF may be aware of the NWDAF device 403 used by an AMF, SMF, and UPF with respect to a specific UE through signaling, thereby allowing the PCF to select an instance of the same NWDAF device 403 that is already in use with respect to the specific UE.

When the NWDAF device 401 needs to search for the NWDAF device 403 with a data collection exposure capability, the NWDAF device 401 may search for, through the NRF device 402, the NWDAF device 403 that provides an Nnwdaf DataManagement service and an ID of a related NF type data source or related NF set data source.

In order to search for the NWDAF device 403 that supports an MTLF, the NWDAF device 401 that supports the MTLF may include analytics filter information with respect to an ML model that is providable and trainable per Analytic ID in response to a registration request for the NRF device 402.

During discovery of the NWDAF device 403 that supports the MTLF, the NRF device 402 may return instances of one or more candidate NWDAF devices 403 to an NF consumer, and an instance of each candidate NWDAF device 403 may include analytics filter information on an ML model trained for each Analytic ID.

<Discovery and Selection of NWDAF>

Multiple instances of the NWDAF device 403 that supports an MTLF may be deployed in a network. In an NF consumer, NWDAF information may be configured locally in another means (for example, an NF consumer).

The NF consumer may make an additional query to a UDM device. A selection function of the NWDAF device 403 that supports an MTLF of the NF consumer may select an NWDAF instance based an instance of the NWDAF device 403 that supports an available MTLF.

The NRF device 402 may return an instance of the NWDAF device 403 that supports one or more candidate MTLFs, and an instance of each candidate NWDAF device 403 (based on a registered profile) may support an Analytic ID with a time less than or equal to a supported analytics delay.

For NWDAF selection, the NF consumer may consider at least one of the following items:

Subscribed network slice selection assistance information (S-NSSAI)
An Analytic ID
A supportable service for each Analytic ID (for example, an ML model provision/training service)
NWDAF service region information, that is, a list of TAIs to which an NWDAF may provide analytics, ML model provision, ML model training, and/or data
When it is a selection to determine a target before NWDAF location information and analytics subscription
When a DCCF is hosted on an NWDAF
An NF type of a data source
Set an ID of an NF data source It may be used when the NWDAF device 401 determines to search for another NWDAF device 403 (MTLF support) responsible for coordinating collection of required data. The NWDAF device 401 may perform new search for the targeted NWDAF device 403 through the NRF device 402 using an NF set ID of a data source.

NWDAF service area information of a profile of the NWDAF device 403 may be used to search for an NWDAF that supports an Nnwdaf DataManagement service.

The presence of an NF type of the data source or an NF set ID of the data source may indicate that the NWDAF may collect data from the NF set or NF type.

Supported analytics delay of a requested Analytic ID
When there are multiple NWDAF deployment instances, the following factors may be considered:

An NWDAF function
An analytics aggregation function
An analytics metadata provisioning function It is applicable when an NF consumer is not capable of determining an instance of the appropriate NWDAF device 403 based on an NRF discovery response. When NWDAF registration is supported in a UDM, the NF consumer may query the UDM (Nudm_UECM_Get service operation) to provide a service to the UE. The NF consumer may consider the following factors to select an NWDAF instance that already provides a service to the UE with respect to an Analytic ID.

An SUPI
An Analytic ID

When selecting the NWDAF device 103 that supports an MTLF for ML model provisioning and model training, the NWDAF device 401 may consider the following additional factors.

Figure 5:
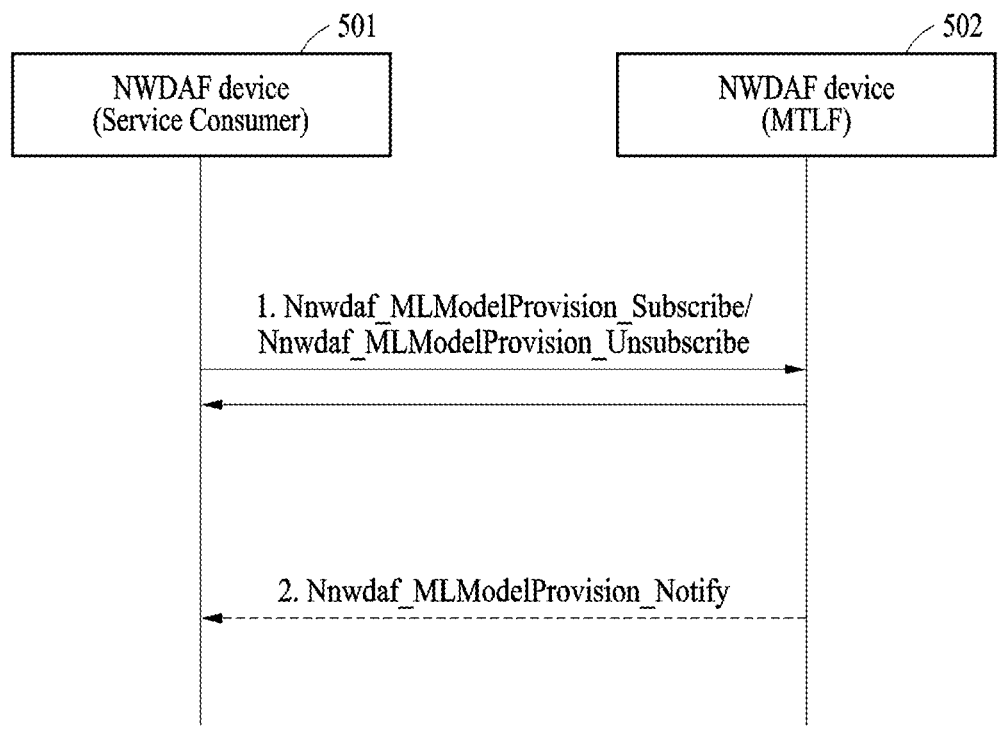
FIG. 5 is a flowchart illustrating an ML model provisioning process according to an example embodiment.

An analytics filter for ML model trained for each Analytic ID
An ML model aggregation capability FIG. 5 is a flowchart illustrating an ML model provisioning process according to an example embodiment.

<Provisioning Procedure of ML Model>

FIG. 5 illustrates a provisioning procedure of an ML model.

An NWDAF device 501 that performs an AnLF or an MTLF may include configuration information on ID(s) and Analytic ID(s) of an NWDAF device related to an NWDAF device 502 that performs the MTLF so as to search for an ML model. That is, the NWDAF device 102 that performs the MTLF may provide the NWDAF device 501 that performs the AnLF or the MTLF with an ML model corresponding to an NWDAF device ID with respect to the Analytic ID(s).

The NWDAF device 501 that performs the AnLF or the MTLF may use a set of the NWDAF device 502 including an MTLF ID so as to search for the NWDAF device 502 that performs the MTLF.

<Subscription/Unsubscription to ML Model>

In FIG. 5, the NWDAF device 501 that performs an AnLF, which is a service consumer, may subscribe or unsubscribe to the NWDAF device 502 that performs an MTLF. At this time, subscribing or unsubscribing is an ML model related to analytics derived by the NWDAF device 501 that performs the AnLF, and a notification may be received from the NWDAF device 501 that performs the MTLF using an ML model provisioning service (Nnwdaf_MLModelProvision).

ML model information received through the notification may be used to output analytics from the NWDAF device 501 that performs the AnLF. The provisioning service for the ML model may be used to modify an existing ML model subscription in the NWDAF device 501. The NWDAF device 501 may simultaneously be a consumer of services provided by other NWDAF(s) and a provider of services to other NWDAF device(s) 502.

In operation 1, the NWDAF device 501, which is a service consumer, may invoke a subscription service operation for provisioning of an ML model (Nnwdaf_MLModelProvision_Subscribe) or an unsubscription service operation for provisioning of the ML model (Nnwdaf_MLModelProvision_Unsubscribe) to subscribe, modify, or unsubscribe an ML model trained in the NWDAF device 502 that supports an MTLF connected to an Analytic ID. A parameter used by the NWDAF device 501 may include at least one of (i) an Analytic ID, (ii) S-NSSAI, (iii) a target area of interest, (iv) an application ID, (v) a target UE, (vi) an ML model target period, (vii) an expiry time, and (viii) ML model information including at least one of an ML model file address, an ML model file, a model ID, and a model version.

When a subscription to the trained ML model connected to the Analytic ID is received, the NWDAF device 502 including the MTLF may perform the following process.

The NWDAF device 502 may determine whether (i) an existing ML model is available for subscription, or (ii) whether to trigger additional training for the existing ML model with respect to subscription.

The NWDAF device 502 that performs the MTLF may determine that additional training is required for an already subscribed ML model. When the NWDAF device 502 that performs the MTLF determines that additional training is required for the already subscribed ML model, the NWDAF device 502 may collect data required for training of the ML model from an NF device, DCCF device, or OAM device.

When invocation of a service operation of the NWDAF device 501 is for subscription modification or unsubscription, the NWDAF device 501 may include an identifier (subscription correlation ID) to be modified in invocation of a subscription service operation for provisioning of the ML model (Nnwdaf_MLModelProvision_Subscribe).

In operation 2, when the NWDAF device 501 subscribes to the trained ML model(s) connected to the Analytic ID(s), the NWDAF device 502 that performs the MTLF may invoke a notification service operation for provisioning of the ML model (Nnwdaf_MLModelProvision_Notify) to transmit trained ML model information (for example, a file address of the trained ML model) to the NWDAF device 501.

The NWDAF device 502 that performs the MTLF may include at least one of ML model information including at least one of an ML model file address, an ML model file, a model ID, and a model version, a validity period, and a spatial validity.

The NWDAF device 502 that performs the MTLF may invoke an Nnwdaf_MLModelProvision_Notify service operation to notify an available retrained ML model when the NWDAF device 502 determines that retraining is required for a previously provided trained ML model.

When a process of operation 1 is performed for subscription modification (that is, including a subscription correlation ID), the NWDAF device 502 that performs the MTLF may invoke the notification service operation for provisioning of the ML model (Nnwdaf_MLModelProvision_Notify) to provide a new learned ML model different from that previously provided or provide a relearned ML model.

<Contents of ML Model Provisioning>

The ML model provisioning service consumer (that is, the NWDAF device 501) illustrated in FIG. 5 may provide input parameters listed below.

Analytics information to use an ML model:
A list of Analytic IDs: Used to identify analytics for which an ML model is used.
Analytics filter information: Used to identify targets such as a slice and a region (for example, S-NSSAI, a field of interest, and the like) to be analyzed through an ML model.
An analytics report target: Indicates an object to be analyzed through an ML model, an entity such as a specific UE, a group of UE(s), or all UEs (that is, all UEs).
An ML model target period: Indicates a time interval [start and end] for which an ML model for analytics is requested. The time interval is expressed as an actual start time and an actual end time (for example, through a UTC time).
A notification target address (+a notification correlation ID): A notification received from an ML model provider NWDAF may be associated with this subscription.

The ML model provider NWDAF (that is, an MTLF of an NWDAF) device 502 may provide output information listed below to the NWDAF device 501 which is a service consumer of an ML model provisioning service operation.

(Only for Nnwdaf_MLModelProvision_Notify) Notification correlation information
ML model information including an ML model file address for an Analytic ID (for example, URL or FQDN) or an ADRF ID in which an ML model is stored
A validity period: Indicates a period during which a provided ML model may be applied.
A spatial validity: Indicates an area to which a provided ML model may be applied.

The spatial validity and the validity period may be determined by an MTLF internal logic of the NWDAF device 502. In operation 1, when the NWDAF device 501 provides an area of interest to analytics filter information or provides an ML model target period, spatial validity analytics filter information provided by the NWDAF device 502 may include part or to all of the area of interest, and the validity period may include part or all of the ML model target period.

<Nnwdaf_MLModelProvision Service—ML Model Provisioning Service>

A service description: This service may allow a consumer to be notified when an ML model corresponding to a subscription parameter becomes available.

When a subscription is accepted by an NWDAF, a consumer NF device receives an identifier (subscription correlation ID) from the NWDAF so as to additionally manage (modify and delete) this subscription. A modification to an ML model subscription may be performed by the NWDAF based on an operator policy and a configuration.

(1) Performance of Nnwdaf_MLModelProvision_Subscribe Service Operation (Subscription Service Operation for ML Model Provisioning)
Service operation name: Nnwdaf_MLModelProvision_Subscribe
Description: An NWDAF ML model provisioning may be subscribed using a specific parameter.
Required input: Analytic ID(s) defined in a notification target address (+a notification correlation ID)
Input and Optional: A model for analyzing a subscription correlation ID (when modifying an ML model subscription), analytics filter information indicating a condition required to be met for analytics information reporting, and an analytics reporting target indicating an object to which ML is applied may request an entity such as a specific UE, a group of UE(s) or any UE (that is, all UEs).
Required output: When a subscription is accepted, a subscription correlation ID (required for managing this subscription).
Output and Optional: None
(2) Performance of Nnwdaf_MLModelProvision_Unsubscribe Service Operation (Unsubscription Service Operation for ML Model Provisioning)
Service operation name: Nnwdaf_MLModelProvision_Unsubscribe
Description: Provison of an NWDAF ML model may be unsubscribed.

Input and Required: A subscription correlation ID
Input and Optional: None
Output and Required: Display a result of performing an operation.
Output and Optional: None (3) Performance of Nnwdaf_MLModelProvision_Notify Service Operation (Notification Service Operation for ML Model Provisioning)

Service operation name: Nnwdaf_MLModelProvision_Notify Description: An NWDAF may notify ML model information to a consumer instance subscribed to a specific NWDAF service.

Input and Required: A set of tuples (Analytic ID, a model file address (for example, URL or FQDN), and notification correlation information.

Input and Optional: None Output and Required: Display a result of performing an operation.
Output and Optional: None FIG. 6 is a flowchart illustrating an ML model request process according to an example embodiment.

Figure 6:
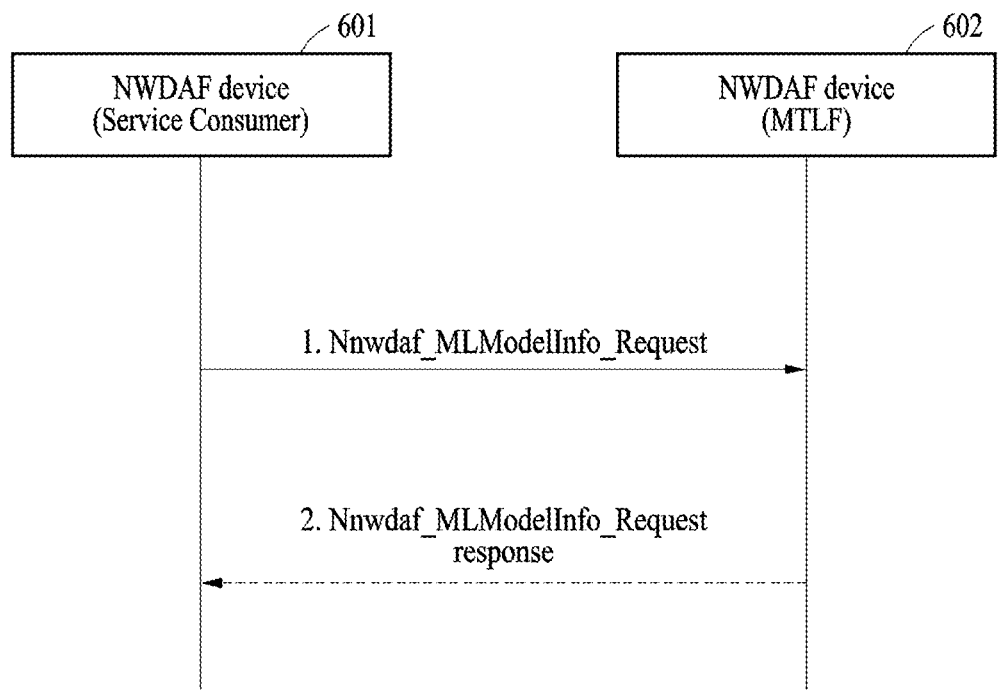
FIG. 6 is a flowchart illustrating an ML model request process according to an example embodiment.

Referring to FIG. 6, an NWDAF service consumer, that is, an NWDAF device 601 may request an NWDAF device 602 including MTLF ML model information using an Nnwdaf_MLModelInfo service.

The ML model information may be used by the NWDAF device 101 that performs an AnLF to analyze network data. The NWDAF device 601 (for example, NWDAF(MTLF+AnLF)) may simultaneously be a consumer of a service provided by another NWDAF device 602 and a provider of this service to other NWDAF(s).

In operation 1, the NWDAF device 601 that supports an AnLF may invoke an ML model information request service operation (Nnwdaf_MLMoldelInfo_Request) to request ML model(s) connected to an Analytic ID from the NWDAF device 602 that supports an MTLF. A parameter used when the NWDAF device 601, which is an NWDAF service consumer, invokes an information request service operation, may include at least one of an Analytic ID, S-NSSAI, a target area of interest, an application ID, a target UE, an ML model target period, and an expiry time.

When a request for ML model information for Analytics is received, the NWDAF device 602 that performs the MTLF may perform the following process.

The NWDAF device 602 may (i) determine whether an existing trained ML model is available for the request, or (ii) determine whether an additional training trigger for the existing trained ML model is required for the request.

When the NWDAF device 602 that performs the MTLF determines that additional training is required for an already requested ML model, the NWDAF may start collecting data from an NF device, DCCF device, or OAM device required for ML model training.

In operation 2, the NWDAF device 602 that performs the MTLF may invoke an ML model information request response service operation (Nnwdaf_MLModelInfo_Request response) to respond to the NWDAF device 601 (service consumer) with ML model information (including an ML model file address). The NWDAF device 103 that performs the MTLF may invoke an ML model information request response service operation including at least one of (i) ML model information, (ii) a validity period, and (iii) a spatial validity. At this time, the ML model information may include at least one of an ML model file address, an ML model file, a model ID, and a model version.

Figure 7:
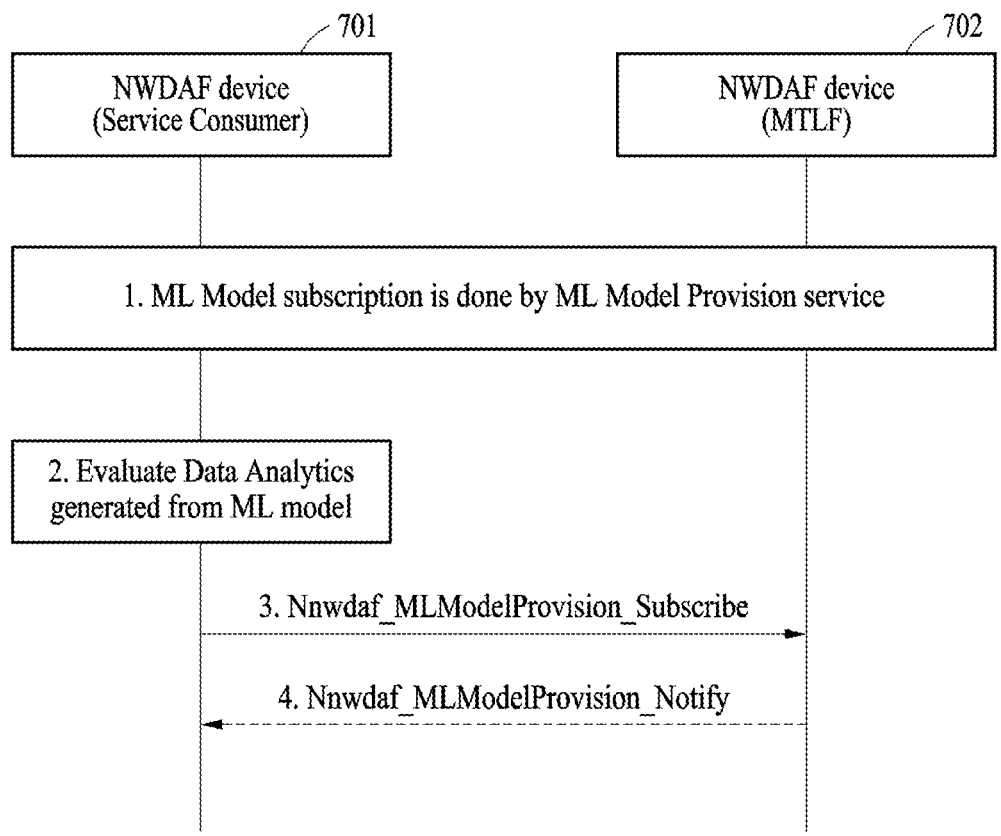
FIG. 7 is a flowchart specifically illustrating an ML model negotiation process according to an example embodiment.

FIG. 7 is a flowchart specifically illustrating an ML model negotiation process according to an example embodiment.

In operation 1, a subscription to an ML model between an NWDAF device 701 and an NWDAF device 702 may be already performed through the process of FIG. 5. Here, the NWDAF device 701 may correspond to the NWDAF device 501 of FIG. 5, and the NWDAF device 702 may correspond to the NWDAF device 502 of FIG. 5.

In operation 2, the NWDAF device 701 may evaluate an analytics result of network data generated from the ML model. To this end, FIG. 18 may be used.

In operation 3, the NWDAF device 701 may invoke, from the NWDAF device 702, a subscription service operation for provisioning of the ML model (Nnwdaf_MLModelProvision_Subscribe). At this time, a subscription ID included in the subscription service operation may be the same as a subscription ID used in operation 1.

That is, when invoking the subscription service operation of operation 3 again, the NWDAF device 701 may include a parameter same as that included when previously invoking the subscription service operation for provisioning of the ML model to request a new ML model different from a previous one or re-request an ML model previously provided through a subscription or request process from the NWDAF device 702. At this time, the NWDAF device 701 may incorporate an alternative ML model flag into the subscription service operation for provisioning of the ML model in operation 3 to request a new ML model different from a previous one or re-request a previously provided ML model from the NWDAF device 702.

In operation 4, the NWDAF device 702 may invoke, from an NWDAF device, a notification service operation for provisioning of the ML model (Nnwdaf_MLModelProvision_Notify). At this time, the notification service operation may include at least one of ML model information different from the ML model provided in operation 1 (for example, including at least one of an ML model file, an ML model file address, a model version, or a model ID), a validity period, and a spatial validity.

Figure 8:
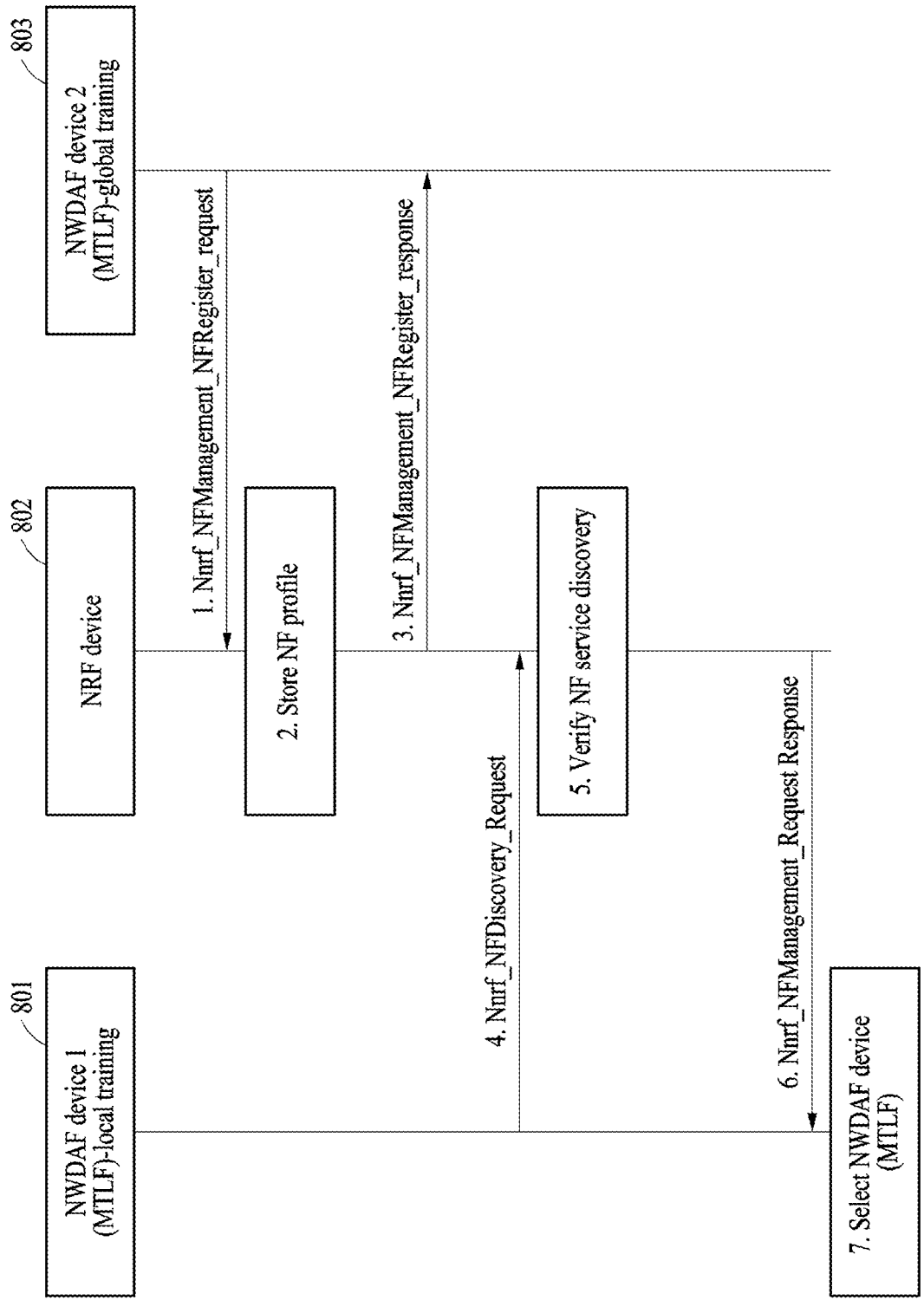
FIG. 8 is a flowchart specifically illustrating an ML model discovery process 1 considering federation learning according to an example embodiment.

FIG. 8 is a flowchart specifically illustrating an ML model discovery process 1 considering federation learning according to an example embodiment.

The discovery process of FIG. 8 may be similar to the discovery process described to with reference to FIG. 4.

<Discovery and Selection of NWDAF>

In FIG. 8, an NWDAF device 801 and an NWDAF device 803 may participate in federation learning, and both may include an MTLF. The NWDAF device 801 may perform local training in federation learning, and the NWDAF device 803 may perform global training in federation learning.

The NWDAF device 801 (service consumer) may search for and select the NWDAF device 803 that provides requested analytics information, a required analytics function and/or a requested ML model, and supports ML model training.

The NWDAF device 801 may require other search and selection parameters. Various methods of performing a search and selection mechanism may vary depending on an ML model/data for processing various types of analytics (ML model/data for processing NF-related analytics and ML model/data for processing UE-related analytics). The ML model or data for processing analytics related to an NF device may indicate an ML model/data for processing analytics that does not require an SUPI or SUPI group (for example, an ML model for processing NF load analytics). The ML model/data for processing UE-related analytics may indicate an ML model/data for processing analytics that requires an SUPI or SUPI group (for example, an ML model for processing UE mobility analytics).

In order to search for an NWDAF device that performs an MTLF using an NRF, the following conditions may need to be satisfied.

(i) When model training is related to NF(s) and an NWDAF service consumer (other than NWDAF) is not capable of providing an area of interest for requested model training, the NWDAF device 801 may select the NWDAF device 803 having a large service area from candidate NWDAFs. When the NWDAF device 801 receives information on the NWDAF device(s) 803 having an ML model update capability, the NWDAF device 801 may preferably select the NWDAF device 803 having a large serving area and an ML model update capability. When the NWDAF device 803 is not capable of providing a requested ML model (for example, when a selected NWDAF rejects an analytics request/subscription because an NF device for collection of network data is out of a service area of the NWDAF), the NWDAF device 801 may query the NRF device 802 with a service area of the NF device to select another target NWDAF 803.

(ii) When model training is related to UE(s) and an NWDAF service consumer (NWDAF device 803) is not capable of providing an area of interest for requested model training, the NWDAF device 801 may select the NWDAF device 803 having a large service area from candidate NWDAF devices 803. In response to discovery, alternatively, when the NWDAF device 801 receives the NWDAF device(s) 803 having an ML model update capability, the NWDAF device 801 may preferably select the NWDAF device 803 having a large serving area and an ML model update capability.

When the NWDAF device 803 is not capable of providing an ML model for requested UE(s) or is not capable of providing training (for example, an NWDAF providing another service area), the NWDAF device 803 may reject an analytics request/subscription or determine an AMF that serves a UE as specified. In order to request UE location information from the AMF and discover another target NWDAF that serves a region where the UE(s) is located, the NWDAF device 803 may query the NRF device 802 with a tracking area where the UE is located.

When the NWDAF device 801 needs to search for the NWDAF device 803 capable of collecting data from a specific data source identified as an NF set ID or NF type, the NWDAF device 801 may query the NRF device 802 that provides the NF set ID or NF type in a search request.

An NF set ID or NF type of a data source that serves a specific UE may be determined.

In order to search for an NWDAF registered in a UDM with respect to a given UE, the NWDAF device 801 or other NWDAFs interested in providing and training UE-related data or an ML model may make a query to a UDM device to search for an instance of the NWDAF device 803 that is already providing a service to the UE.

A PCF may be aware of the NWDAF device 803 used by an AMF, SMF, and UPF with respect to a specific UE through signaling, thereby allowing the PCF to select an instance of the same NWDAF device 803 that is already in use with respect to the specific UE.

When the NWDAF device 801 needs to search for the NWDAF device 803 with a data collection exposure capability, the NWDAF device 801 may search for, through the NRF device 802, the NWDAF device 803 that provides an Nnwdaf DataManagement service operation and an ID of a related NF type data source or related NF set data source.

In order to search for the NWDAF device 803 that performs the MTLF, the NWDAF device 801 that performs the MTLF may include at least one of analytics filter information, a trainable and providable ML model ID, an ML model version, and an ML model aggregation capability with respect to an ML model that is trained per Analytic ID in response to a registration request for the NRF device 802.

During discovery of the NWDAF device 803 that performs the MTLF, the NRF device 802 may return instances of one or more candidate NWDAF devices 803 to an NF consumer, and an instance of each candidate NWDAF device 803 may include analytics filter information on an ML model of an initial model that is untrained or an ML model that is trained for each Analytic ID.

In FIG. 8, the NWADF device 801 may perform local training in federation learning, and the NWDAF device 803 may perform global training in federation learning.

In operation 1, the NWDAF device 803 may invoke, from the NRF device 802, a registration service operation (Nnrf_NFManagement_NFRegister request) for the NWDAF device 803. At this time, the registration service operation may include at least one of (i) a list of supported Analytic IDs, (ii) a service supported by the NWDAF device 803 (for example, an Nnwdaf_MLModelProvision service and an Nnwdaf_MLModelInfo service), (iii) a serving area where an ML model is provided, (iv) S-NSSAI, (v) ML model information including at least one of an ML model file address, an ML model file, a model ID, and a model version, and (vi) a federation learning capability (aggregation capability for a result of training an ML model (for example, an ML model update capability)).

In operation 2, the NRF device 802 may store a profile of an NF device of the NWDAF device 803.

In operation 3, the NRF device 802 may invoke, from the NWDAF device 803, a registration response service operation (Nnrf_NFManagement_NFRegister response).

In operation 4, the NWDAF device 801 may invoke, from the NRF device 802, a request service operation (Nnrf_NF-Discovery_Request) for searching for the NWDAF device 803. At this time, the request service operation may include at least one of (i) a list of supported Analytic IDs, (ii) a service supported by the NWDAF device 803 (for example, an Nnwdaf_MLModelProvision service and an Nnwdaf_MLModelInfo service), (iii) a serving area where an ML model is provided, (iv) S-NSSAI, (v) ML model information including at least one of an ML model file address, an ML model file, a model ID, and a model version, and (vi) a federation learning capability (aggregation capability for a result of training an ML model (for example, an ML model update capability)).

Then, in operation 5, the NRF device 802 may invoke, from the NWDAF device 801, a discovery request response service operation (Nnrf_NFDiscovery_Request_response). Here, the response service operation may include a list and an address of an instance ID of the NWDAF device 803.

In operation 5, the NWDAF device 801 may select an NWDAF device that performs an MTLF.

Figure 9:
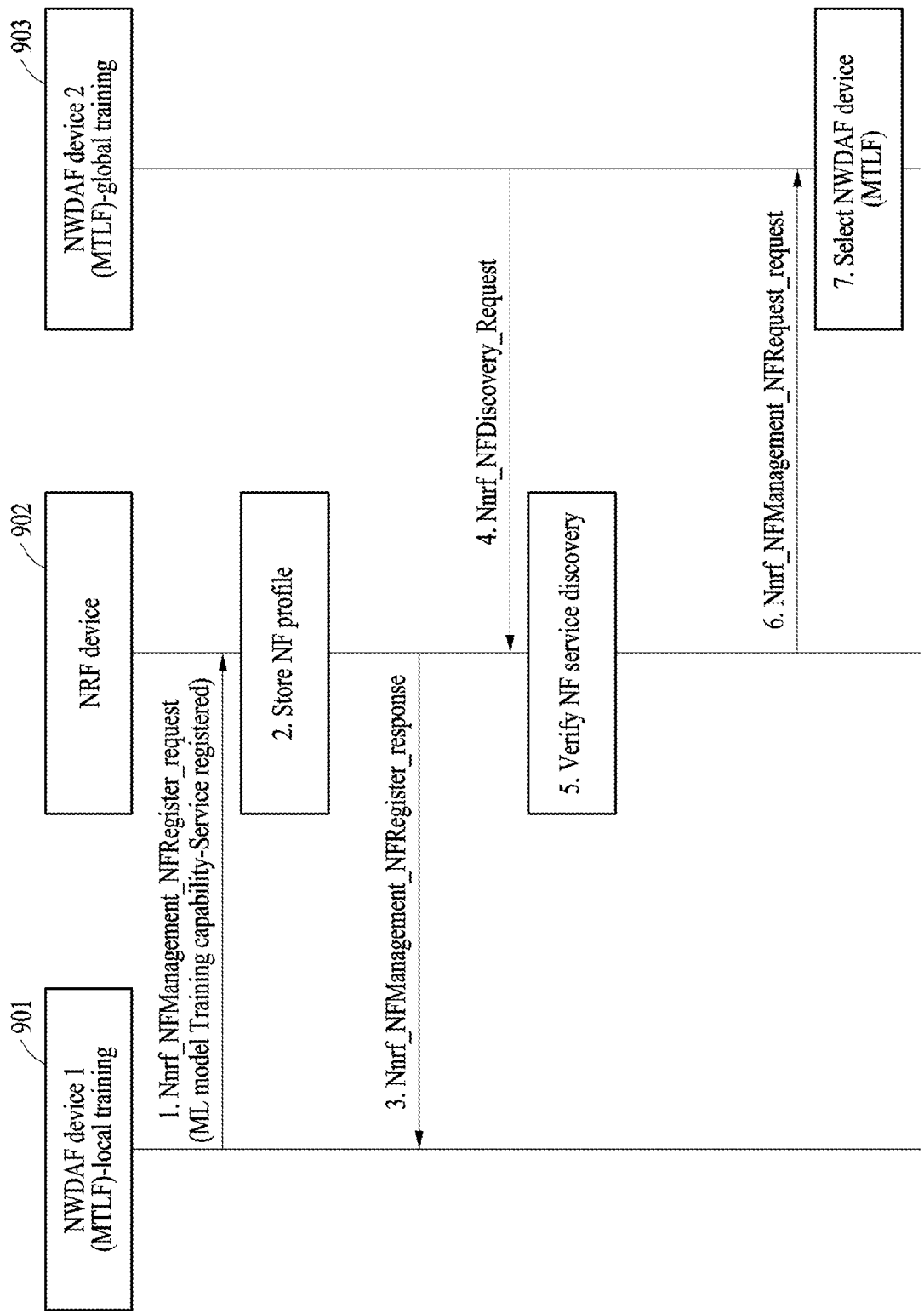
FIG. 9 is a flowchart specifically illustrating an ML model discovery process 2 considering federation learning according to an example embodiment.

FIG. 9 is a flowchart specifically illustrating an ML model discovery process 2 considering federation learning according to an example embodiment.

<Discovery and Selection of NWDAF>

In FIG. 9, an NWDAF device 901 and an NWDAF device 903 may participate in federation learning, and both may include an MTLF. The NWDAF device 901 may perform local training in federation learning, and the NWDAF device 903 may perform global training in federation learning.

The NWDAF device 903 (service consumer) may use an NWDAF search principle to select the NWDAF device 901 that supports requested analytics information, required analytics function, and/or requested ML model training. In this case, the NWDAF device 903 may support at least one of an ML model training service (Nnwdaf_MLModelTraining) or an ML model information service (Nnwdaf_MLModelTrainingInfo) to search for the NWDAF device 901.

The NWDAF device 903 may require other search and selection parameters. Various methods of performing a search and selection mechanism may vary depending on various types of ML models/data (ML model/data for processing NF-related analytics and ML model/data for processing UE-related analytics). The ML model or data for processing NF-related analytics may indicate an ML model/data for processing analytics that does not require an SUPI or SUPI group (for example, an ML model for processing NF load analytics). The ML model/data for processing UE-related analytics may indicate an ML model/data for processing analytics that requires an SUPI or SUPI group (for example, an ML model for processing UE mobility analytics).

In order to search for the NWDAF device 903 that supports the MTLF using an NRF, the following conditions may need to be satisfied.

(i) When an ML model to be trained is related to NF(s) and an NWDAF service consumer (other than an NWDAF) is not capable of providing an area of interest for requested ML model training, the NWDAF device 903 may select an NWDAF having a large service area from candidate NWDAFs. In response to discovery, alternatively, when the NWDAF device 903 receives NWDAF(s) having an ML model update capability, the NWDAF device 903 may preferably select the NWDAF device 901 having an ML model update capability for a large serving area.

When the NWDAF device 903 is not capable of providing a requested ML model (for example, when a selected NWDAF rejects an analytics request/subscription because an NF to be contacted is out of a service area of an NWDAF), the NWDAF device 903 may query the NRF device 902 with a service area of the NF to be contacted to determine another target NWDAF 901.

(ii) When an ML model to be trained is related to NF(s) and an NWDAF service consumer (other than an NWDAF) is not capable of providing an area of interest for requested ML model training, the NWDAF device 903 may select the NWDAF device 901 having a large service area from candidate NWDAF devices 901. In response to discovery, alternatively, when the NWDAF device 903 receives the NWDAF device(s) 901 having an ML model aggregation capability, the NWDAF device 903 may preferably select the NWDAF device 901 having a large serving area and an ML model update capability.

When the NWDAF device 901 is not capable of providing ML model training for requested UE(s) (for example, an NWDAF providing another service area), the NWDAF device 901 may reject an analytics training request/subscription or determine an AMF that serves a UE as specified. In order to request UE location information from the AMF and discover another target NWDAF that serves a region where the UE(s) is located, the NWDAF device 901 may query the NRF device 902 with a tracking area where the UE is located.

When the NWDAF device 903 needs to search for the NWDAF device 901 capable of collecting data from a specific data source identified as an NF set ID or NF type, the NWDAF device 901 may query the NRF device 902 that provides the NF set ID or NF type in a search request.

An NF set ID or NF type of a data source that serves a specific UE may be determined.

In order to search for an NWDAF registered in a UDM with respect to a given UE, an NWDAF device 903 or other NWDAFs interested in UE-related data or analytics may make a query to a UDM device to search for an instance of the NWDAF device 901 that is already providing a service to the UE.

A PCF may be aware of the NWDAF device 903 used by an AMF, SMF, and UPF with respect to a specific UE through signaling, thereby allowing the PCF to select an instance of the same NWDAF device 903 that is already in use with respect to the specific UE.

When the NWDAF device 903 needs to search for the NWDAF device 901 with a data collection exposure capability, the NWDAF device 903 may search for, through the NRF device 902, the NWDAF device 901 that provides an Nnwdaf DataManagement service operation and an ID of a related NF type data source or related NF set data source.

In order to search for the NWDAF device 901 that supports the MTLF, the NWDAF device 901 that supports the MTLF may include at least one of analytics filter information and a service providable for model training (that is, an Nnwdaf_MLModelTraining service or an Nnwdaf_MLModelTrainingInfo service) with respect to an ML model that is trainable per Analytic ID in response to a registration request for the NRF device 902.

During discovery of the NWDAF device 901 that supports the MTLF, the NRF device 902 may return instances of one or more candidate NWDAF devices 901 to an NF consumer, and an instance of each candidate NWDAF device 901 may include analytics filter information for an ML model that is trainable for each Analytic ID.

In FIG. 9, the NWADF device 901 may perform local training in federation learning, and the NWDAF device 903 may perform global training in federation learning.

In operation 1, the NWDAF device 901 may invoke, from the NRF device 902, a registration service operation (Nnrf_NFManagement_NFRegister request) for the NWDAF device 901. At this time, the registration service operation may include at least one of a list of supported Analytic IDs, per supported service (for example, an Nnwdaf_MLModelTraining service or an Nnwdaf_MLModelTrainingInfo service), a serving area where an ML model is provided, S-NSSAI, ML model information including at least one of an ML model file address, an ML model file, a model ID, and a model version, and a federation learning capability (ML model training capability).

In operation 2, the NRF device 902 may store a profile of an NF device of the NWDAF device 901.

In operation 3, the NRF device 902 may invoke an Nnrf_NFManagement_NFRegister response from the NWDAF device 901.

In operation 4, the NWDAF device 903 may invoke, from the NRF device 902, a request service operation (Nnrf_NFDiscovery_Request) for searching for the NWDAF device 901. At this time, the request service operation may include at least one of an Analytic ID, per supported service (for example, an Nnwdaf_MLModelTraining service or an Nnwdaf_MLModelTrainingInfo service), a serving area where an ML model is provided, S-NSSAI, ML model information including at least one of an ML model file address, an ML model file, a model ID, and a model version, and a federation learning capability (for example, an ML model training capability).

Then, in operation 5, the NRF device 902 may invoke, from the NWDAF device 903, a response service operation (Nnrf_NFDiscovery_Request_response). Here, the response service operation may include a list and an address of an instance ID of the NWDAF device 901.

In operation 5, the NWDAF device 903 may select at least one NWDAF device 901 capable of learning a local ML model that performs the MTLF.

Figure 10:
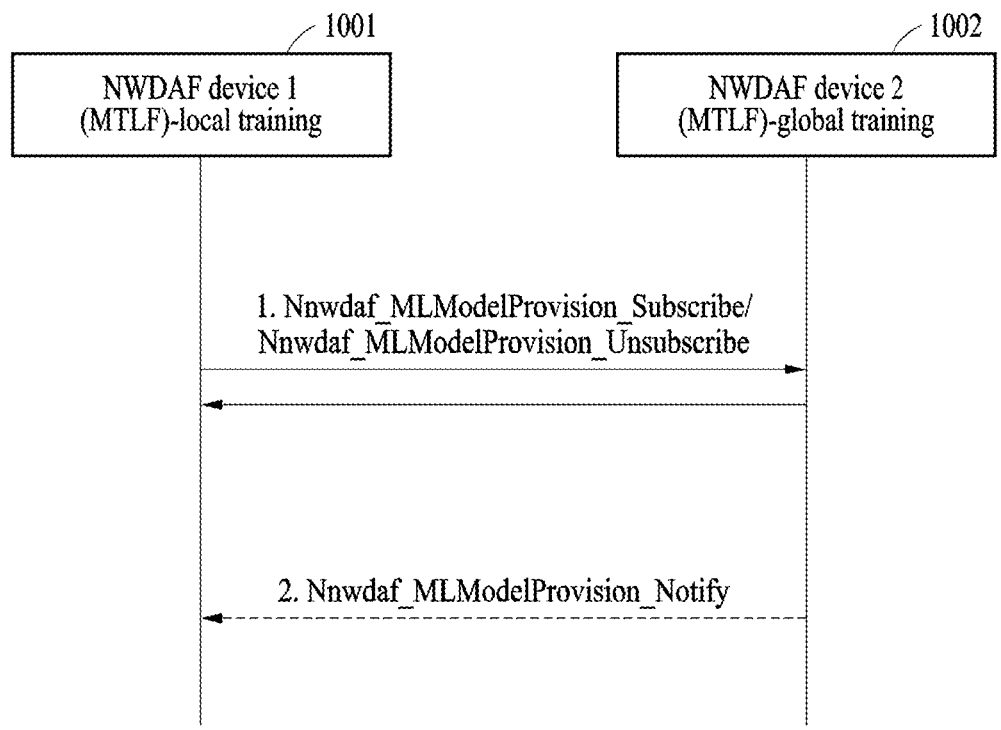
FIG. 10 is a flowchart illustrating a method for provisioning an ML model considering federation learning according to an example embodiment.

FIG. 10 is a flowchart illustrating a method for provisioning an ML model considering federation learning according to an example embodiment.

FIG. 10 may be substantially the same as the provisioning process of FIG. 5. However, in FIG. 10, an NWDAF device 1001 and an NWDAF device 1002 may participate in federation learning, and both may include an MTLF. The NWDAF device 1001 may perform local training in federation learning, and the NWDAF device 1002 may perform global training in federation learning.

<Provisioning Procedure of ML Model>

FIG. 10 illustrates a provisioning procedure of an ML model.

The NWDAF device 1001 may be configured locally with ID(s) and Analytic ID(s) of an NWDAF device that performs an MTLF to search for an ML model of an untrained initial model or a trained ML model. The NWDAF device 1001 may use a search for the NWDAF device 1002 within a set of the configured NWDAF devices 1002 including an MTLF ID, if necessary.

<Subscription/Unsubscription to ML Model>

In FIG. 10, the NWDAF device 1001 that performs an MTLF, which is a service consumer, may be used to subscribe or unsubscribe to the NWDAF device 502 that performs the MTLF, and thus may receive a notification from the NWDAF device 501 that performs the MTLF using an ML model provisioning service (Nnwdaf_MLModelProvision) with respect to ML model information in related analytics.

The ML model information received through the notification may be used by the NWDAF device 1001 to train the ML model. The provisioning service may be also used by the NWDAF device 1001 to modify an existing ML model subscription. The NWDAF device 1001 may simultaneously be a consumer of this service provided by other NWDAF(s) and a provider of this service to other NWDAF device(s) 1002.

In operation 1, the NWDAF device 1001, which is a service consumer, may invoke a subscription service operation for provisioning of an ML model (Nnwdaf_MLModelProvision_Subscribe) or an unsubscription service operation for provisioning of the ML model (Nnwdaf_MLModelProvision_Unsubscribe) to subscribe, modify, or unsubscribe an ML model of an untrained initial model or a trained ML model connected to an Analytic ID.

A parameter used by the NWDAF device 1001 may include at least one of (i) an Analytic ID, (ii) S-NSSAI, (iii) a target area of interest, (iv) an application ID, (v) a target UE, (vi) an ML model target period, (vii) an expiry time, and (viii) ML model information including at least one of an ML model file address, an ML model file, a model ID, and a model version.

When a subscription to the ML model of the untrained initial model or the trained ML model connected to the Analytic ID is received, the NWDAF device 1002 including an MTLF may perform the following process.

The NWDAF device 1002 may determine whether (i) an existing trained ML model is available for subscription or (ii) whether to trigger additional training for the existing trained ML model with respect to subscription.

The NWDAF device 1002 that performs the MTLF may determine that additional training is required for the existing ML model. When the NWDAF device 1002 determines that additional training is required, the NWDAF device 1002 may collect data required for training of the ML model from an NF device, DCCF device, or OAM device.

When invocation of a service operation of the NWDAF device 1001 is for subscription modification or unsubscription, the NWDAF device 1001 may include an identifier (subscription correlation ID) to be modified in invocation of Nnwdaf_MLModelProvision_Subscribe.

In operation 2, when the NWDAF device 1001 subscribes to the ML model of the untrained initial model or the trained ML model(s) connected to the Analytic ID(s), the NWDAF device 1002 may invoke an Nnwdaf_MLModelProvision_Notify service operation including information on the ML model of the untrained initial model or information on the trained ML model to transmit a file address of the ML model of the untrained initial model or the trained ML model.

The information on the ML model of the untrained initial model or the information on the trained ML model that may be provided by the NWDAF device 1002 that performs the MTLF may include ML model information including at least one of (i) an ML model file address, an ML model file, a model ID, and a model version, (ii) a validity period, and (iii) a spatial validity.

The NWDAF device 1002 that performs the MTLF may invoke a notification service operation for provisioning of the ML model (Nnwdaf_MLModelProvision_Notify) to notify an available retrained ML model when the NWDAF device 1002 determines that retraining is required for an ML model of a previously provided untrained initial model or a trained ML model.

When a process of operation 1 is performed for subscription modification (that is, including a subscription correlation ID), the NWDAF device 1002 that performs the MTLF may provide a new learned ML model different from that previously provided, or may provide a relearned ML model by invoking the Nnwdaf_MLModelProvision_Notify service operation.

Figure 11:
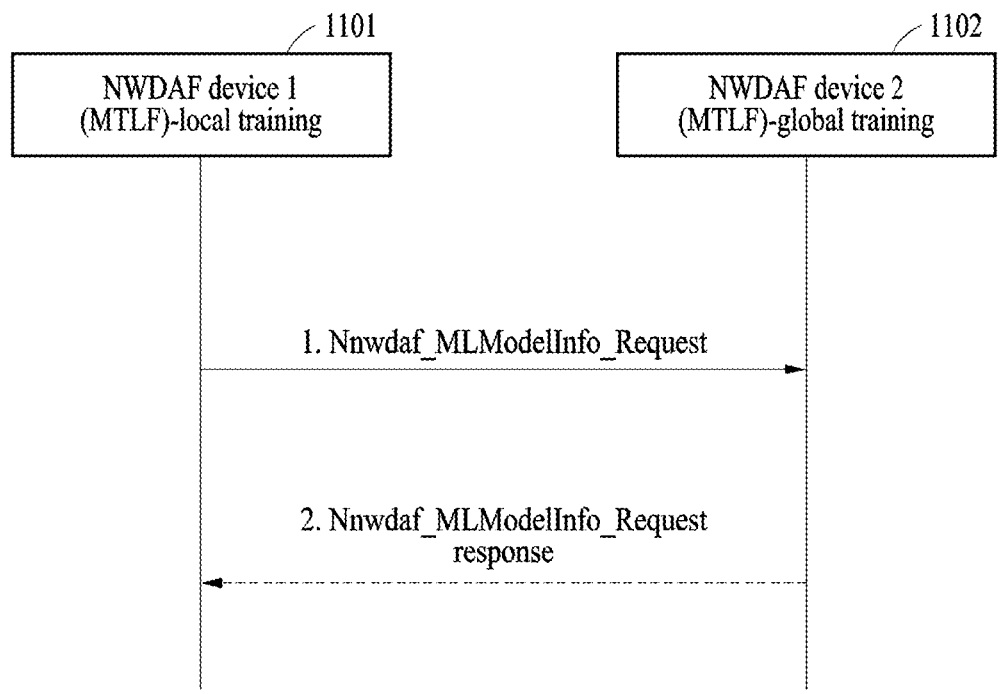
FIG. 11 is a flowchart illustrating an ML model request process considering federation learning according to an example embodiment.

FIG. 11 is a flowchart illustrating an ML model request process considering federation learning according to an example embodiment.

FIG. 11 may be substantially the same as the ML model request process of FIG. 6. However, in FIG. 11, an NWDAF device 1101 and an NWDAF device 1102 may participate in federation learning, and both may include an MTLF. The NWDAF device 1101 may perform local training in federation learning, and the NWDAF device 1102 may perform global training in federation learning.

Referring to FIG. 11, an NWDAF service consumer, that is, the NWDAF device 1101 may request the NWDAF device 1102 including ML model information using an Nnwdaf_MLModelInfo service operation.

The ML model information may be used by the NWDAF device 1101 to analyze network data. The NWDAF device 1101 (for example, NWDAF(MTLF+AnLF)) may simultaneously be a consumer of a service provided by another NWDAF device 1102 and a provider of this service to other NWDAF(s).

In operation 1, the NWDAF device 1101 may invoke an ML model information request service operation (Nnwdaf_MLMoldelInfo_Request) to request ML model(s)

connected to an Analytic ID. A parameter that may be provided by an NWDAF service consumer may include at least one of an Analytic ID, S-NSSAI, a target area of interest, an application ID, a target UE, an ML model target period, an expiry time, and ML model information including at least one of an ML model file address, an ML model file, a model ID, and a model version.

When a request for ML model information for analytics is received, the NWDAF device 1102 that performs an MTLF may perform the following process.

The NWDAF device 1102 may (i) determine whether an existing trained ML model is available for the request, or (ii) determine whether an additional training trigger for the existing trained ML model is required for the request.

When the NWDAF device 1102 that performs the MTLF determines that additional training is required, this NWDAF may start collecting data from an NF device, DCCF device, or OAM device required for ML model training.

In operation 2, the NWDAF device 1102 that performs the MTLF may invoke an ML model information request response service operation (Nnwdaf_MLModelInfo_Request response) for an ML information request service operation (Nnwdaf_MLModelInfo_Request) to respond to the NWDAF device 1101 (service consumer), including at least one of ML model information, a validity period, and a spatial validity. ML model information that may be provided by an NWDAF that performs the MTLF may include at least one of an ML model file address, an ML model file, a model ID, and a model version.

Figure 12:
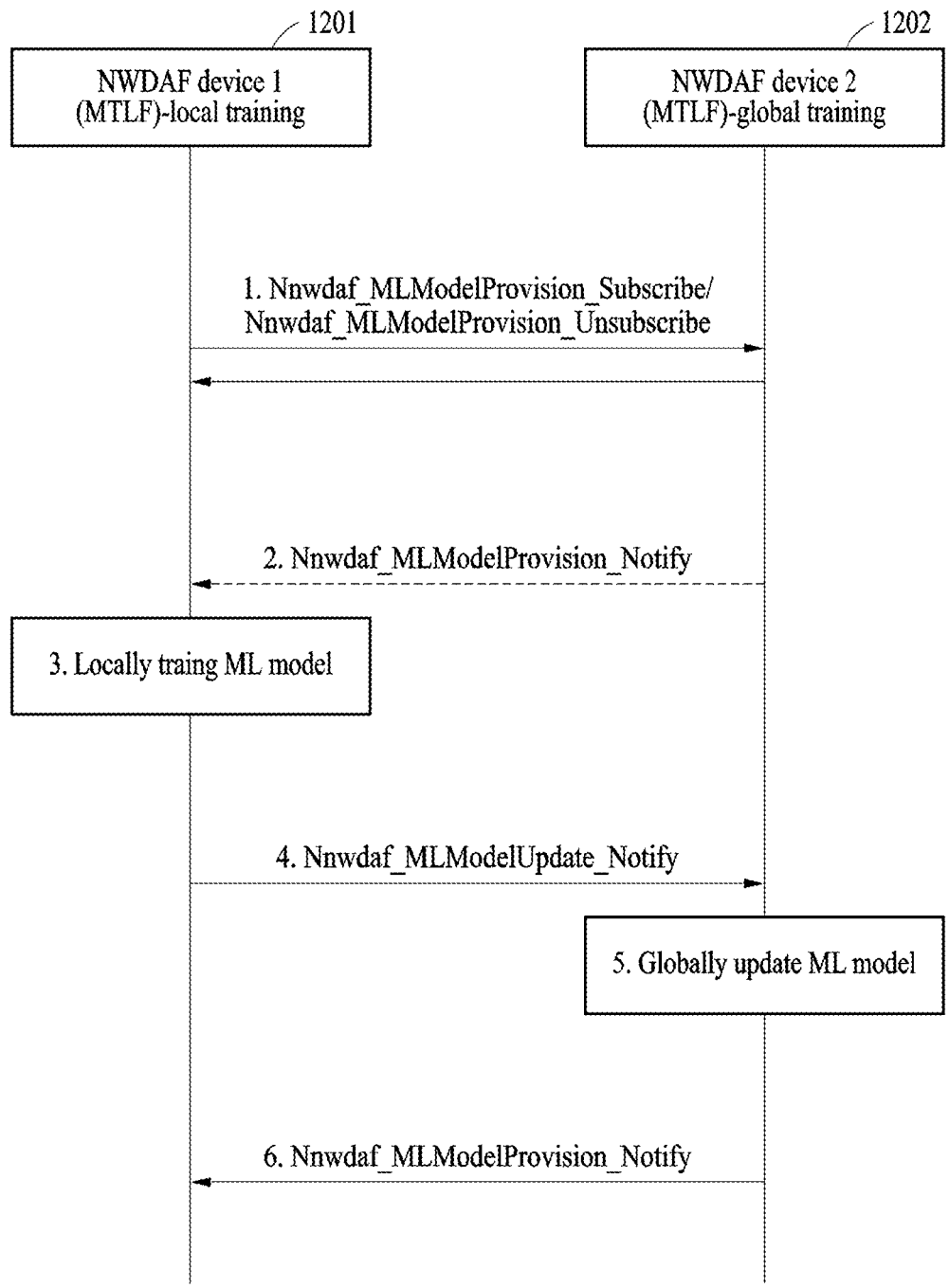
FIG. 12 is a flowchart illustrating an ML model update process after a method for provisioning an ML model considering federation learning according to an example embodiment.

FIG. 12 is a flowchart illustrating an ML model update process after a method for provisioning an ML model considering federation learning according to an example embodiment.

Referring to FIG. 12, operations 1 and 2 may be the same as operation 1 and 2 described with reference to FIG. 9. However, a service operation of operation 1 may further include at least one of (i) an Analytic ID, (ii) S-NSSAI, (ii) a target area of interest, (iv) a target UE, (v) an ML model target period, (vi) an expiry time, and (vii) the maximum number of updates of an ML model.

In addition, a service operation of operation 2 may include at least one of (i) ML model information including at least one of an ML model file address, an ML model file, a model ID, and a model version, (ii) a validity period, (iii) a spatial validity, (iv) a description of a requested parameter for ML model update, and (v) a description of a budget for an update reporting time (for example, a top-k gradient, a threshold for sparsification of gradient, and the like).

In operation 3, the NWDAF device 1201 may locally train the ML model.

In operation 4, the NWDAF device 1201 may invoke an ML model update notification service operation (Nnwdaf_MLModelUpdate_Notify) from the NWDAF device 1202 that performs a global update. The notification service operation may include at least one of (i) an Analytic ID, (ii) a requested parameter for ML model update (for example, a gradient), (iii) a time stamp, (iv) ML model information including at least one of an ML model file address, an ML model file, a model ID, and a model version, and (v) a training area (for example, a list of target areas (TAs) targeted for training, and the like).

In operation 5, the NWDAF device 1202 may globally update the ML model. Here, globally updating the ML model may mean aggregating, by each of a plurality of NWDAF devices 1202, the locally trained ML model, and then changing the ML model by reflecting a gradient of the ML model expressed as a polynomial.

In operation 6, the NWDAF device 1202 may invoke, from the NWDAF device 1201, a notification service operation for provisioning of the ML model. At this time, the notification service operation may include an updated model.

Figure 13:
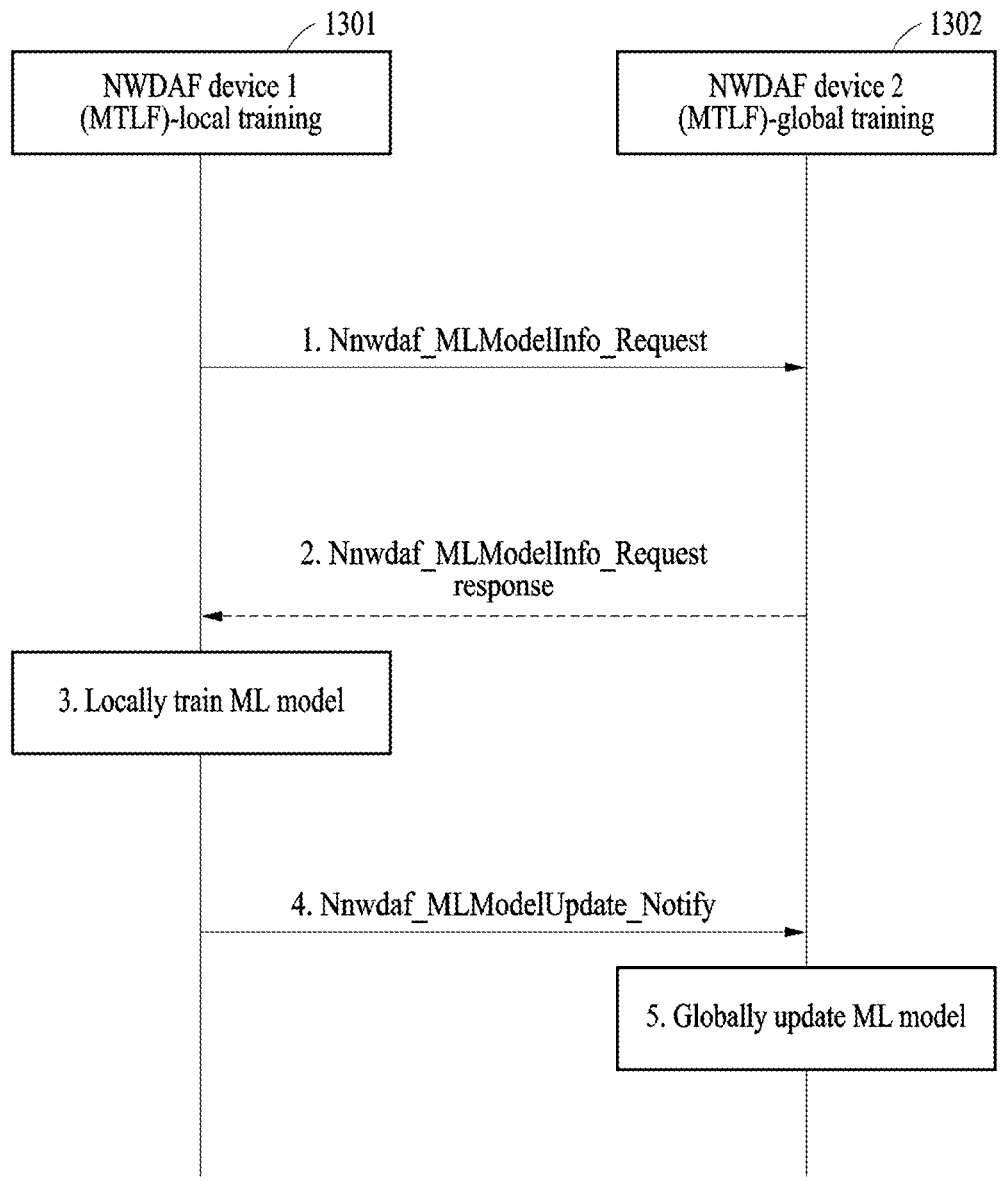
FIG. 13 is a flowchart illustrating an ML model update process after an ML model request process considering federation learning according to an example embodiment.

FIG. 13 is a flowchart illustrating an ML model update process after an ML model request process considering federation learning according to an example embodiment.

Referring to FIG. 13, operations 1 and 2 may be the same as operations 1 and 2 described with reference to FIG. 10. However, a service operation of operation 1 may further include at least one of (i) an Analytic ID, (ii) S-NSSAI, (ii) a target area of interest, (iv) a target UE, (v) an ML model target period, (vi) an expiry time, and (vii) the maximum number of updates of an ML model. In addition, a service operation of operation 2 may include at least one of (i) ML model information including at least one of an ML model file address, an ML model file, a model ID, and a model version, (ii) a validity period, (iii) a spatial validity, (iv) a description of a requested parameter for ML model update, and (v) a description of a budget for an update reporting time (for example, a top-k gradient, a threshold for sparsification of gradient, and the like).

In operation 3, an NWDAF device 1301 may locally train the ML model.

In operation 4, the NWDAF device 1301 may invoke an ML model update notification service operation (Nnwdaf_MLModelUpdate_Notify) from an NWDAF device 1302 that performs a global update. The update notification service operation may include at least one of (i) an Analytic ID, (ii) a requested parameter for ML model update (for example, a gradient), (iii) a time stamp, (iv) ML model information including at least one of an ML model file address, an ML model file, a model ID, and a model version, and (v) a training area (for example, a list of TAs targeted for training, and the like).

In operation 5, the NWDAF device 1302 may globally update the ML model. Here, globally updating the ML model may mean aggregating the locally trained ML model, for example, calculating an average or weighted average, and then changing the ML model by reflecting an aggregated gradient value of the ML model expressed as a polynomial.

Figure 14:
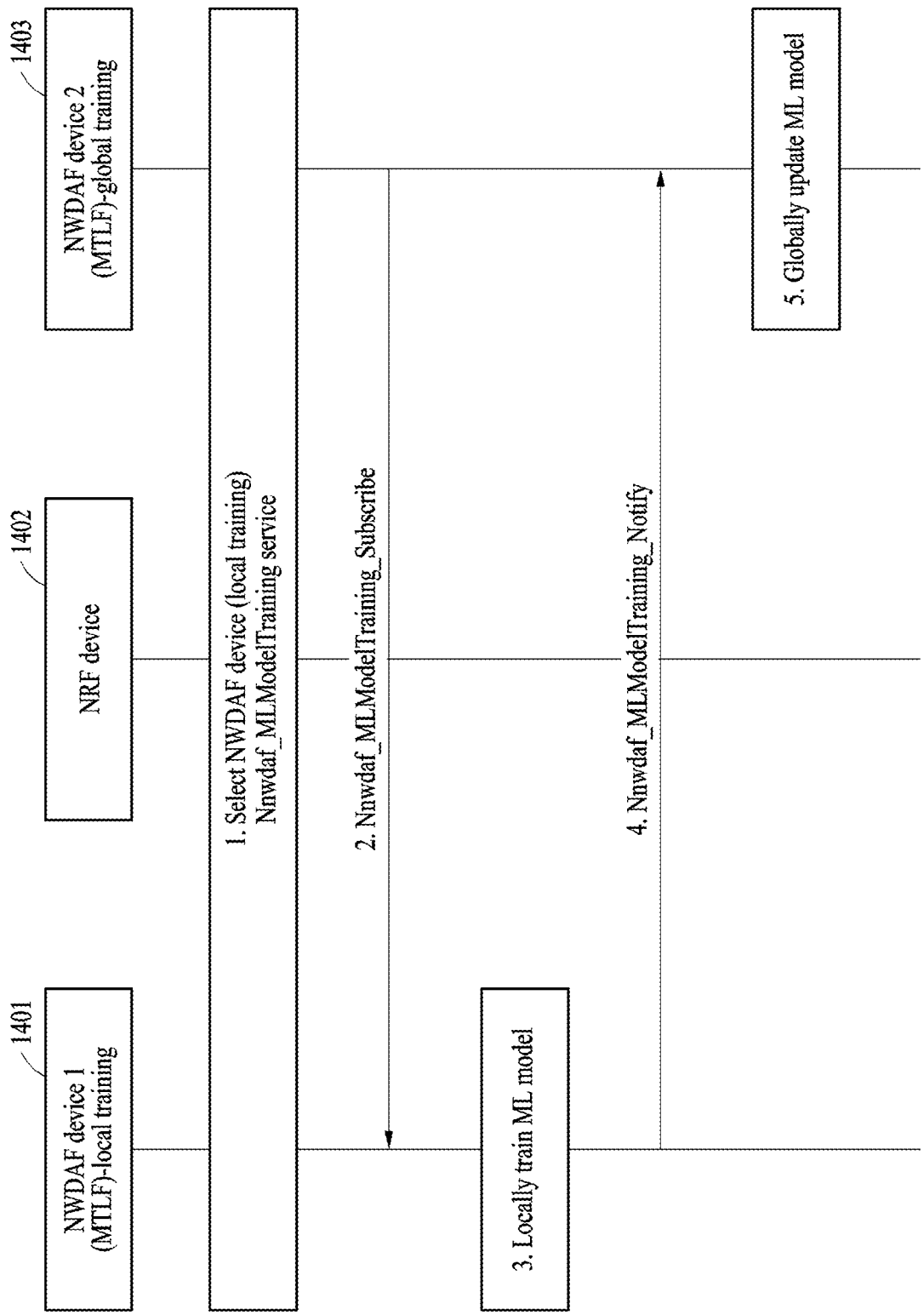
FIG. 14 is a flowchart illustrating an ML model update subscription process considering federation learning according to an example embodiment.

FIG. 14 is a flowchart illustrating an ML model update subscription process considering federation learning according to an example embodiment.

In FIG. 14, an NWDAF device 1401 and an NWDAF device 1402 may participate in federation learning, and both may include an MTLF. The NWDAF device 1401 may perform local training in federation learning, and the NWDAF device 1402 may perform global training in federation learning.

In operation 1 of FIG. 14, the NWDAF device 901, the NRF device 902, and the NWDAF device 1403 may be the same as the discovery process of the NWDAF device 903 that performs the MTLF previously described with reference to FIG. 9.

In operation 2, the NWDAF device 1403 may invoke, from the NWDAF device 1401, an ML model training subscription service operation (Nnwdaf_MLModelTraining_Subscribe). At this time, the training subscription service operation may include at least one of (i) an Analytic ID, (ii) S-NSSAI, (iii) a target area of interest, (iv) an application ID, (v) a target UE, (vi) an ML model target period, (vii) an expiry time, and (viii) ML model information including at least one of an ML model file address, an ML model file, a model ID, and a model version. In addition, the training subscription service operation may further include at least one of a description of a requested parameter for ML model update and a description of a budget for an update reporting time (for example, a target reporting time).

In operation 3, the NWDAF device 1401 may locally train an ML model.

In operation 4, the NWDAF device 1401 may invoke an ML model training notification service operation (Nnwdaf_MLModelTraining_Notify) from the NWDAF device 1402 that performs a global update. The training notification service operation may include at least one of (i) an Analytic ID, (ii) a requested parameter for ML model update (for example, a gradient), (iii) a time stamp, (iv) ML model information including at least one of an ML model file address, an ML model file, a model ID, and a model version, and (v) a training area (for example, a list of TAs targeted for training, and the like).

In operation 5, the NWDAF device 1402 may globally update the ML model. Here, globally updating the ML model may mean aggregating the locally trained ML model, for example, calculating an average or weighted average of a gradient that is a local training result, and then changing the ML model by reflecting a gradient of the ML model expressed as a polynomial.

Figure 15:
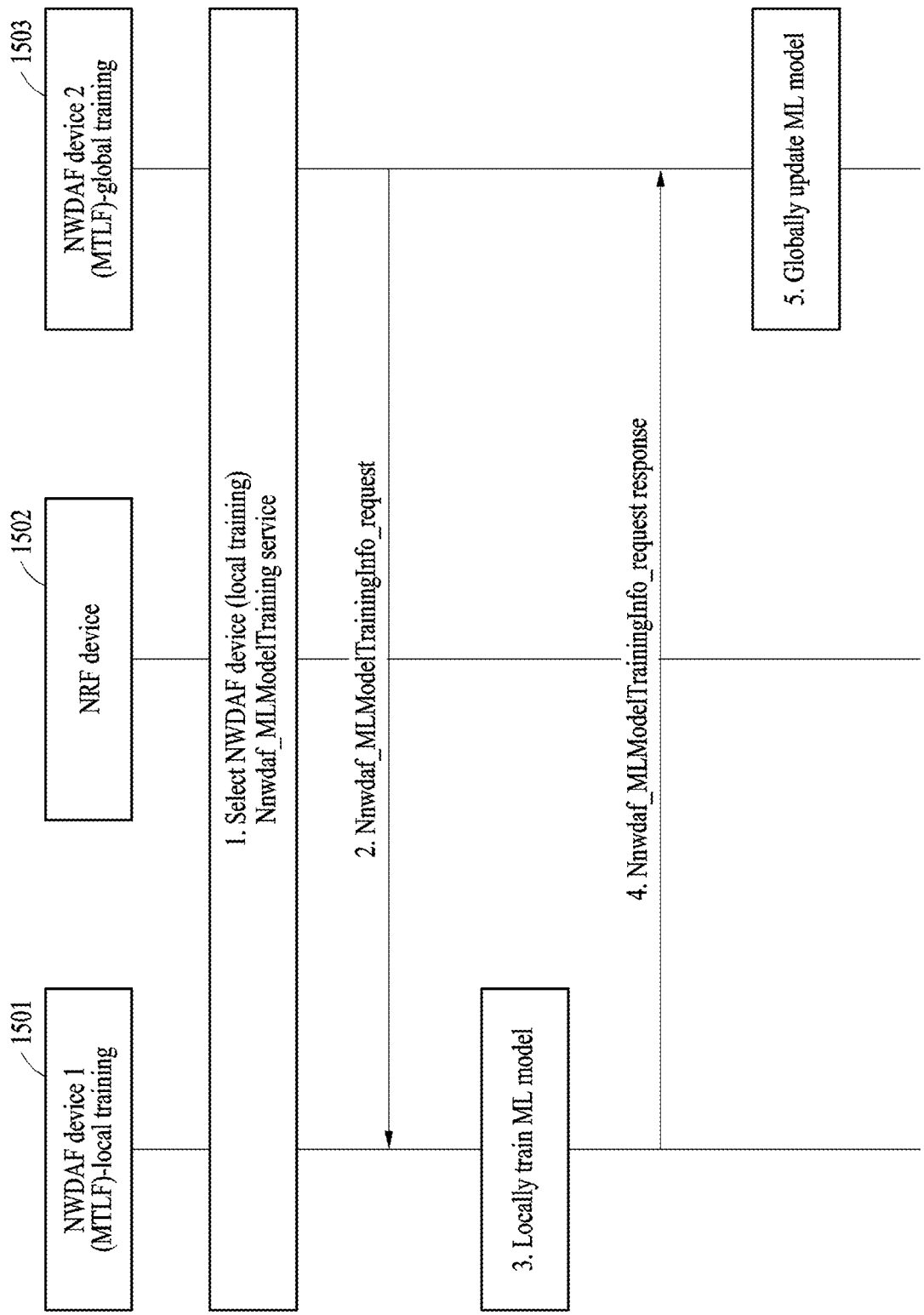
FIG. 15 is a flowchart illustrating an ML model training request process considering federation learning according to an example embodiment.

FIG. 15 is a flowchart illustrating an ML model training request process considering federation learning according to an example embodiment.

In FIG. 15, an NWDAF device 1501 and an NWDAF device 1502 may participate in federation learning, and both may include an MTLF. The NWDAF device 1501 may perform local training in federation learning, and the NWDAF device 1502 may perform global training in federation learning.

In operation 1 of FIG. 15, the NWDAF device 901, the NRF device 902, and the NWDAF device 1403 may be the same as the discovery process of the NWDAF device 903 that performs the MTLF previously described with reference to FIG. 9.

In operation 2, an NWDAF device 1503 may invoke, from the NWDAF device 1502, an ML model training request service operation (Nnwdaf_MLModelTrainingInfo_request). At this time, the training request service operation may include at least one of (i) an Analytic ID, (ii) S-NSSAI, (iii) a target area of interest, (iv) an application ID, (v) a target UE, (vi) an ML model target period, (vii) an expiry time, and (viii) ML model information including at least one of an ML model file address, an ML model file, a model ID, and a model version. In addition, the training request service operation may further include at least one of a description of a requested parameter for ML model update and a description of a budget for an update reporting time (for example, a top-k gradient, a threshold for sparsification of gradient, and the like).

In operation 3, the NWDAF device 1501 may locally train an ML model.

In operation 4, the NWDAF device 1501 may invoke an ML model training request response service operation (Nnwdaf_MLModelTrainingInfo_request response) from an NWDAF device 1502 that performs global training. The training response service operation may include at least one of an Analytic ID, a requested parameter for ML model update (for example, a gradient), a time stamp, a training area, an ML model ID, and an ML model version.

In operation 5, the NWDAF device 1502 may globally update the ML model. Here, globally updating the ML model may mean aggregating the locally trained ML model, for example, calculating an average or weighted average of a gradient that is a local training result, and then changing the ML model by reflecting a gradient of the ML model expressed as a polynomial.

TABLE 1

| Service Name | Service Operations | Operation Semantics | Example Consumer(s) |
| --- | --- | --- | --- |
| Nnwdaf_MLModelProvision | Subscribe Unsubscribe Notify | Subscribe/Notify | NWDAF (ML Model Consumer) |
| Nnwdaf_MLModelInfo | Request | Request/Response | NWDAF (ML Model Consumer) |
| Nnwdaf_MLModelUpdate | Notify | Subscribe/Notify | NWDAF (ML Model Provider) |
| Nnwdaf_MLModelTraining | Subscribe Unsubscribe Notify | Subscribe/Notify | NWDAF (ML Model global training NWDAF) |
| Nnwdaf_MLModelTraingInfo | Request | Request/Response | NWDAF (ML Model global training NWDAF) |

Table 1 shows the services illustrated in FIGS. 12 to 16.

An Nnwdaf_MLModelProvision service operation or an Nnwdaf_MLModelInfo service operation may include the following input and output.

(i) Input:
   An analytic ID or configured ML model information (for example, specific purpose or pre-configured ML model ID) (if available)

(ii) Output:
   A description of a corresponding ML model with a model parameter with respect to each requested Analytic ID. Here, the description of the ML model with the model parameter may include at least one of an ML model type (for example, a neural network), an ML model structure (for example, a weight matrix describing a weight), and a connection and hierarchy for each node of a neural network.

A model ID and model version. Here, the model ID and model version may be local information rather than global unique information of an ML model provider NWDAF.

Optional: A description of a requested parameter for model update and a description of a budget for an update reporting time. Here, the description of the requested parameter for model update may include a requested parameter (for example, a gradient and a specific method for specifying a gradient (for example, a top-k gradient, a threshold for sparsation of gradient, and the like).

The Nnwdaf_MLModelUpdate_Notify service operation may need to include the following input and output:

(i) Input:
   An Analytic ID, a model update request parameter (for example, a gradient), an update time stamp, a target model ID, and an update version
   Optional: Evaluation of an updated model if available (ii) Output:
   Display of success or failure When the ML model provider NWDAF provides a model to a consumer NWDAF by invoking Nnwdaf_ModelProvision_Notify, the provider NWDAF may (implicitly) subscribe to an Nnwdaf_ModelUpdate service operation of the consumer NWDAF to obtain a result of a locally updated model parameter when the consumer NWDAF is capable of training the model.

An Nnwdaf_MLModelTraining service operation or an Nnwdaf_MLModelTrainingInfo service operation may need to include the following input and output:

(i) Input:

An Analytic ID, an expiry time, and ML model information (an ML model file, a model ID, and a model version)

Optional: A description of a requested parameter for model update and a description of a budget for an update reporting time. Here, the description of the requested parameter for model update may include a requested parameter (for example, a gradient and a specific method for specifying a gradient (for example, a top-k gradient, a threshold for sparsation of gradient, and the like), S-NSSAI, a target area of interest, an application ID, a target UE, and an ML model target period.

(ii) Output:

An Analytic ID, a requested parameter for ML model update (for example, a gradient), a time stamp, an ID and a version of an ML model targeted for training, and a training area (for example, a list of TAs targeted for training, and the like)

Figure 16:
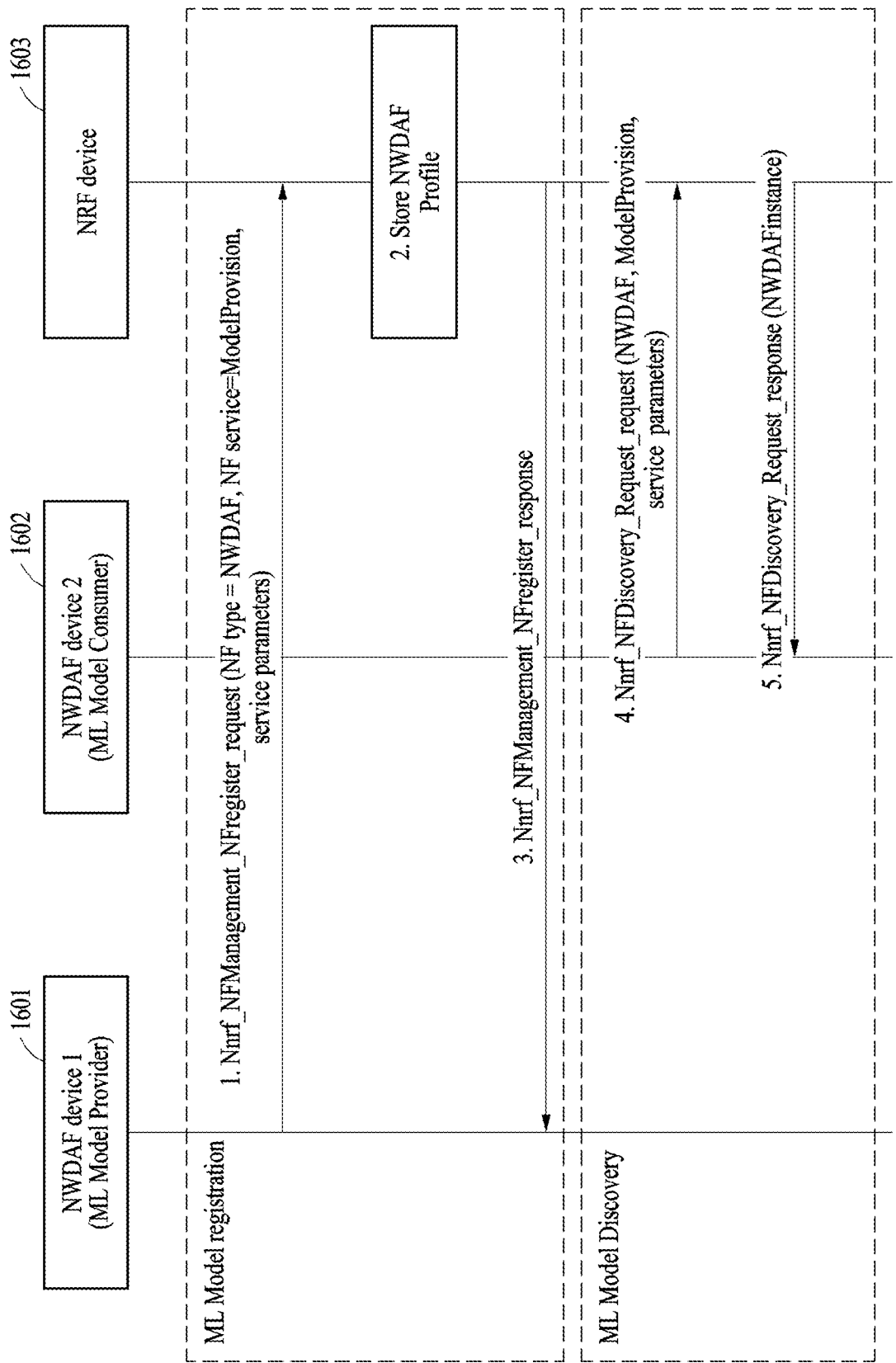
FIGS. 16 and 17 are diagrams illustrating an ML model processing process according to an example embodiment.
Figure 17:
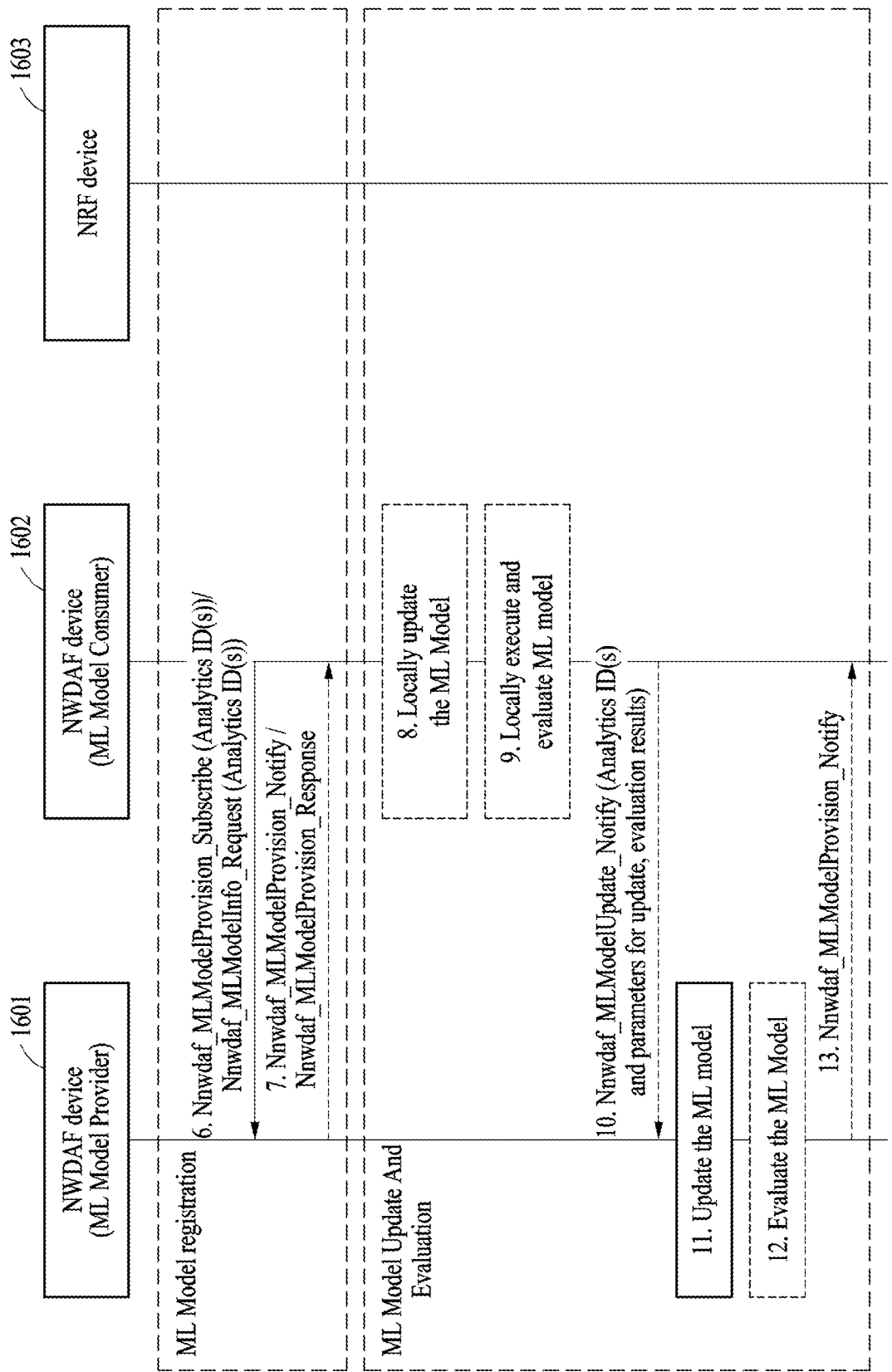

FIGS. 16 and 17 are diagrams illustrating an ML model processing process according to an example embodiment.

In operation 1, an NWDAF device 1 1601, which is an ML model provider, may register a function of providing an untrained initial version of model or a trained model (that is, an "MLModelProvision service operation" with a list of supported Analytic IDs) with an NRF device 1603 as part of a profile.

In operation 2, an NRF device 1603 may store an NWDAF profile of the NWDAF device 1 1601.

In operation 3, the NRF device 1603 may invoke, from the NWDAF device 1 1601, a registration response service operation.

In operation 4, an NWDAF device 2 1602 may invoke, from the NRF device 1603, a discovery request service operation including a service parameter list (for example, Analytic ID, and the like) so as to search for the NWDAF device 1 1601 that provides an "MLModelProvision service".

In operation 5, the NRF device 1603 may invoke, from the NWDAF device 2 1602, a discovery request response service operation including an instance of the NWDAF device 1 1601 that provides the "MLModelProvision service".

In operation 6, the consumer NWDAF device 2 1602 may invoke, from the NWDAF device 1 1601, a request service operation or subscription service operation of the "MLModelProvision service" using an instance of the searched provider NWDAF device 1 1601.

In operation 7, the NWDAF device 1 1601 may invoke, from the NWDAF device 2 1602, a request response service operation or subscription notification service operation including a model parameter for an untrained initial version of model or a trained model.

In operation 8, when the NWDAF device 2 1602 is capable of training an ML model, the NWDAF device 2 1602 may locally train the model and model parameter.

In operation 9, the NWADF device 2 1602 may locally evaluate the ML model after training the ML model.

In operation 10, when a subscription to the ML model is performed, the NWDAF device 2 1602 may invoke, from the NWDAF device 1 1601, an ML model update notification service operation (Nnwdaf_MLModelUpdate_Notify) to transmit information on the locally trained ML model.

In operation 11, the NWDAF device 1 1601 may aggregate the trained ML model transmitted from the NWDAF device 2 1602 to update the ML model based on a globally trained ML model.

In operation 11, the NWDAF device 1 1601 may evaluate the ML model.

In operation 12, the NWDAF device 1 1601 may transmit the updated ML model to the NWDAF device 2 1602 through a notification service operation for provisioning of the ML model.

Figure 18:
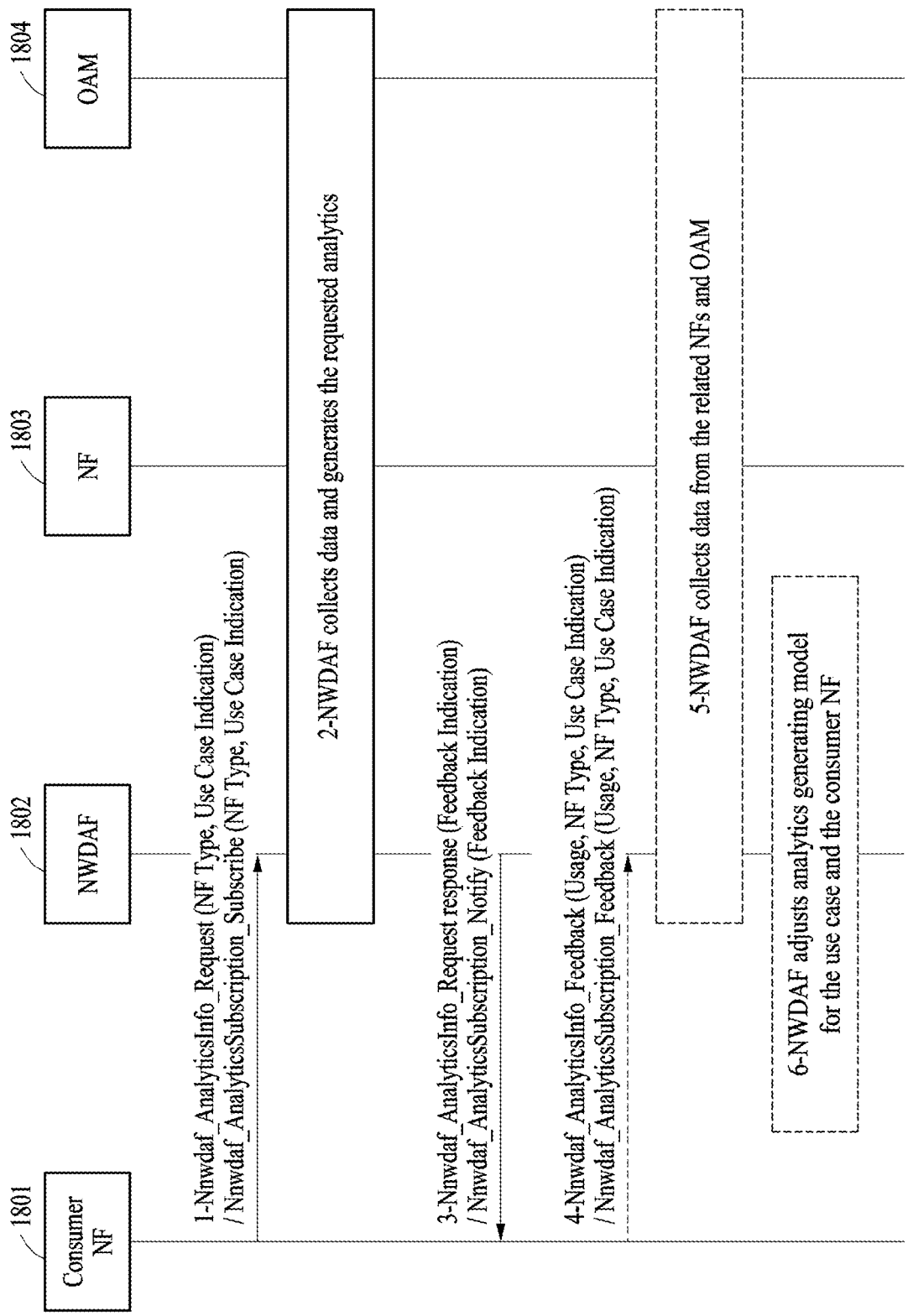
FIG. 18 is a diagram illustrating an ML model evaluation and update process according to an example embodiment.

FIG. 18 is a diagram illustrating an ML model evaluation and update process according to an example embodiment.

Referring to FIG. 18, in operation (i), a consumer NF device 102 may invoke, from a NWDAF device 101, a network data analytics request service operation. At this time, the consumer NF device 102 may invoke, from the NWDAF device 101, the network data analytics request service operation (for example, Nnwdaf_AnalyticsInfo_Request) or a network data analytics subscription service operation (for example, Nnwdaf_AnalyticsSubscription_Subscribe).

The network data analytics request service operation or the network data analytics subscription service operation may include a type of a consumer NF device (for example, an AMF, SMF, or the like) and a use case indication. Alternatively, the network data analytics request service operation or the network data analytics subscription service operation may further include analytics filter information.

Here, the type may be information for identifying a type of an NF device to which the consumer NF device belongs. In addition, the use case indication may be information indicating a plurality of use cases. For example, the use case indication may identify a purpose for analytics of network data requested by the consumer NF device 102.

In operation (ii), the NWDAF device 101 may collect first network data from a provider NF device 103 or an OAM device 105. In addition, the NWDAF device 101 may generate analytics information on the first network data by analyzing the first network data collected in response to a network data analytics request received from the consumer NF device 102.

At this time, the NWDAF device 101 may identify an analytics model that generates analytics information on the first network data. For example, the NWDAF device 101 may generate an analytics model itself or invoke an analytics model generated by another entity.

For example, the analytics model may be determined based on at least one of a target of analytics reporting, an analytics reporting parameter, analytics filter information, a type of an NF device (NF type), or a use case indication.

At this time, the target of analytics reporting may mean a UE or a group of UEs. In addition, the analytics reporting parameter may include a time stamp for the first network data collected by the NWDAF device 101, a collection period for the first network data, and the like. The analytics filter information may include a location of the UE, slice information used by the UE, and the like. In addition, the type of the NF device may mean information for identifying a type of the consumer NF device 102. In addition, the use case indication may mean information indicating a plurality of use cases.

In operation (iii), the NWDAF device 101 may need to obtain feedback from the consumer NF device 102 so as to evaluate an analytics model for a specific use case or the consumer NF device 102. Then, the NWDAF device 101 may provide the analytics information of the first network data to the consumer NF device 102 in response to the network data analytics request received from the consumer NF device 102.

At this time, a response to the network data analytics request may include a response service operation for the network data analytics request (for example, Nnwdaf_AnalyticsInfo_Request_response) or a notification service operation for a network data analytics subscription (Nnwdaf_AnalyticsSubscription_Notify).

The response service operation for the network data analytics request or the notification service operation for the network data analytics subscription may include a feedback indication or an expiry time. The feedback indication may be information for identifying whether it is required to receive feedback on the analytics information of the first network data from the consumer NF device 102. In addition, the expiry time may identify an expiry time for obtaining feedback.

In operation (iv), the consumer NF device 102 may receive the analytics information on the first network data from the NWDAF device 101. In addition, when the feedback indication is enabled for the response service operation for the network data analytics request or the notification service operation for the network data analytics subscription, the consumer NF device 102 may provide the feedback on the analytics information of the first network data to the network analytics function device 101. At this time, the consumer NF device 102 may provide the feedback on the analytics information of the network data to the network data analytics device 101 through a feedback service operation (for example, Nnwdaf_AnalyticsInfo_Feedback or Nnwdaf_AnalyticsSubscription_Feedback).

Here, the feedback service operation may include at least one of an Analytic ID, analytics usage, a type of a consumer NF device (NF type), a use case indication, an evaluation value, a notification target address (+ notification correlation ID), and a time stamp for feedback.

The Analytic ID may be information indicating analytics information related to feedback. The analytics usage may be information for identifying whether the consumer NF device 102 uses the analytics information on the first network data. The analytics usage may be enabled when the consumer NF device 102 performs one or a plurality of actions according to the analytics information.

The type of the consumer NF device may be information for identifying a type of a NF device (for example, an AMF or SMF) to which the consumer NF device 102 belongs. The use case indication may be information for identifying a purpose of an action performed by the consumer NF device 102 according to the analytics information on the first network data. The use case indication may indicate a plurality of use cases.

According to an example embodiment, the use case indication described in operation (i) and the use case indication described in operation (iv) may be different from each other. This is because the consumer NF device 102 does not perform an action on a use case indicated by the use case indication described in operation (i).

An evaluation value may indicate satisfaction with the analytics information of the first network data obtained by the consumer NF device 102 from the NWDAF device 101. The evaluation value may be provided when the consumer NF device 102 evaluates the analytics information of the first network data.

The notification target address and notification correlation information may be information when subscribing to analytics of network data. The notification target address may indicate an address of a consumer NF device. When a subscription is applied, the notification correlation ID may be information for correlating notifications from the NWDAF device 101 with respect to the consumer NF device 102. The time stamp for the feedback may mean a point in time when a consumer NF device generates feedback.

In operation (v), the NWDAF device 101 may collect second network data from the provider NF device 103 or the OAM device 105. The first network data may be the same as or different from the second network data. The provider NF device 103 described in operation (ii) may correspond to a first provider NF device 103-1 of FIG. 1, and the provider NF device 103 described in operation (v) may correspond to a second provider NF device 103-2 of FIG. 1.

In operation (vi), the NWDAF device 101 may evaluate the analytics information of the first network data based on the feedback obtained from the consumer NF device 102 and the second network data collected in operation (v). In addition, the NWDAF device 101 may change an analytics method used when generating the analytics information of the first network data with respect to a specific use case or a specific NF device based on an evaluation result. For example, the NWDAF device 101 may update an analytics model used when generating the analytics information of the first network data (for example, optimizing or additionally training the analytics model).

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and invoking media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products. The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method for discovering a machine learning (ML) model, the method performed by a first network data analytics function (NWDAF) device and comprising:
    invoking, from a network repository function (NRF) device, an ML model discovery request service operation;
    receiving, from the NRF device in response to the ML model discovery request service operation, a discovery response including information for each of one or more NWDAF instances, the information for each NWDAF instance including ML model-related information provided by a corresponding NWDAF device that performs a model training logical function (MTLF);
    selecting an NWDAF instance from the one or more NWDAF instances included in the discovery response, provisioning, to the first NWDAF using a second NWDAF device corresponding to the selected NWDAF instance, an ML model;
    analyzing network data using the ML model.

2. The method of claim 1, wherein
    the NRF device is configured to store a network function (NF) profile for the MTLF by invoking, from the second NWDAF device, a registration request service operation with an NF, and
    the registration request service operation includes at least one of (i) a list of Analytic IDs, (ii) a supported service, (iii) a serving area, and (iv) subscribed network slice selection assistance information (S-NSSAI).

3. The method of claim 1, wherein
    the NRF device is configured to store an NF profile for the MTLF by invoking, from the second NWDAF device, a registration request service operation with an NF, and
    the registration request service operation includes at least one of (i) a list of Analytic IDs, (ii) a supported service, (iii) a serving area, (iv)) subscribed network slice selection assistance information (S-NSSAI), and (v) ML model information including at least one of an ML model file address, an ML model file, a model ID, and a model version.

4. The method of claim 1, wherein the selecting of the NWDAF instance comprises selecting an NWDAF instance based on at least one of (i) subscribed network slice selection assistance information (S-NSSAI), (ii) an Analytic ID, (iii) a supported service, (iv) NWDAF serving area information, (v) NWDAF location information, (vi) an NF type of a data source, (vii) an NF Set ID of the data source, (viii) a supported analytics delay, and (ix) an NWDAF capability.

5. The method of claim 1, wherein
    the first NWDAF device is configured to perform local training of federation learning, and support the MTLF, and
    the second NWDAF device is configured to perform global training of federation learning, and support the MTLF.

6. The method of claim 5, wherein the registration request service operation includes at least one of a list of Analytic IDs, a supported service, a serving area, subscribed network slice selection assistance information (S-NSSAI), ML model information including at least one of an ML model file address, an ML model file, a model ID, and a model version, and an ML model training capability or an ML model update capability.

7. A method for provisioning an a machine learning (ML) model, the method performed by a first network data analytics function (NWDAF) device and comprising:
    invoking, from a second NWDAF that performs a model training logical function (MTLF), a subscription service operation for provisioning of the ML model;
    invoking, from the second NWDAF device, a notification service operation for the subscription service;

provisioning, to the first NWDAF using the second NWDAF device, the ML model;
analyzing network data using the ML model.

8. The method of claim 7, wherein the subscription service operation includes at least one of (i) an Analytic ID, (ii) subscribed network slice selection assistance information (S-NSSAI), (iii) a target area of interest, (iv) an application ID, (v) a target user equipment (UE), (v) an ML model target period, and (vi) an expiry time.

9. The method of claim 7, wherein the subscription service operation includes at least one of (i) an Analytic ID, (ii) subscribed network slice selection assistance information (S-NSSAI), (iii) a target area of interest, (iv) an application ID, (v) a target UE, (v) an ML model target period, (vi) an expiry time, and (vii) ML model information including at least one of an ML model file address, an ML model file, a model ID, and a model version.

10. The method of claim 7, wherein the notification service operation includes at least one of (i) ML model information including an ML model file or an ML model file address, (ii) a validity period, and (iii) a spatial validity.

11. The method of claim 7, wherein the notification service operation includes at least one of (i) ML model information including at least one of an ML model file address, an ML model file, a model ID, and a model version, (ii) a validity period, and (iii) a spatial validity.

12. The method of claim 7, wherein
the invoking of the subscription service operation for provisioning of the ML model comprises invoking a subscription service operation for provisioning of a second ML model after a subscription for provisioning of a first ML model is completed, and
the subscription service operation includes a subscription ID same as a subscription ID for the first ML model.

13. The method of claim 12, wherein the subscription service operation includes at least one of (i) an Analytic ID, (ii) subscribed network slice selection assistance information (S-NSSAI), (iii) a target area of interest, (iv) an application ID, (v) a target UE, (v) an ML model target period, (vi) an expiry time, (vii) ML model information including at least one of an ML model file address, an ML model file, a model ID, and a model version, and (viii) an alternative ML model flag.

14. The method of claim 7, wherein
the first NWDAF device is configured to perform local training of federation learning, and support the MTLF, and
the second NWDAF device is configured to perform global training of federation learning, and support the MTLF.

15. The method of claim 14, wherein the notification service operation includes at least one of (i) ML model information including at least one of an ML model file address, an ML model file, a model ID, and a model version, (ii) a validity period, and (iii) a spatial validity.

16. The method of claim 7, further comprising:
locally training the ML model;
invoking, from the second NWDAF device, an ML model update notification service operation; and
invoking, from the second NWDAF device that globally updates the ML model, a notification service operation for provisioning of the ML model,
wherein the first NWDAF device is configured to perform local training of federation learning on the ML model, and
the second NWDAF device is configured to perform global training of federation learning on the ML model.

17. The method of claim 7, further comprising:
locally training the ML model; and
invoking, from the second NWDAF device that globally updates the ML model, an ML model update notification service operation,
wherein the first NWDAF device is configured to perform local training of federation learning on the ML model, and
the second NWDAF device is configured to perform global training of federation learning on the ML model.

* * * * *